(12) United States Patent
Nomura et al.

(10) Patent No.: US 7,746,369 B2
(45) Date of Patent: Jun. 29, 2010

(54) LENS ARRAY, A LINE HEAD AND AN IMAGE FORMING APPARATUS USING THE LINE HEAD

(75) Inventors: Yujiro Nomura, Shiojiri (JP); Ken Ikuma, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 92 days.

(21) Appl. No.: 12/141,819

(22) Filed: Jun. 18, 2008

(65) Prior Publication Data

US 2009/0009876 A1   Jan. 8, 2009

(30) Foreign Application Priority Data

Jul. 6, 2007   (JP) .............................. 2007-178058
Mar. 12, 2008   (JP) .............................. 2008-062696

(51) Int. Cl.
*B41J 2/45* (2006.01)
*B41J 2/235* (2006.01)
*B41J 15/14* (2006.01)

(52) U.S. Cl. ................. 347/225; 347/224; 347/238; 347/244

(58) Field of Classification Search .......... 347/224, 347/225, 233, 238, 241, 242, 244; 359/799, 359/800
See application file for complete search history.

(56) References Cited

U.S. PATENT DOCUMENTS

2005/0001896 A1*   1/2005   Wakisaka ................... 347/241

FOREIGN PATENT DOCUMENTS

| EP | 0 348 003 A2 | 12/1989 |
| JP | 02-004546 | 1/1990 |
| JP | 06-208006 | 7/1994 |
| JP | 2005-276849 | 10/2005 |

* cited by examiner

*Primary Examiner*—David N Spector
(74) *Attorney, Agent, or Firm*—Hogan Lovells US LLP

(57) ABSTRACT

A lens array, includes: a clear substrate; and a plurality of plastic lens substrates each of which includes a plurality of lenses and which are arranged on at least one of surfaces of the clear substrate.

4 Claims, 20 Drawing Sheets

SUB SCANNING DIRECTION YY

MAIN SCANNING DIRECTION XX

LENS ARRAY, A LINE HEAD AND AN IMAGE FORMING APPARATUS USING THE LINE HEAD

CROSS REFERENCE TO RELATED APPLICATION

The disclosure of Japanese Patent Applications No. 2007-178058 filed on Jul. 6, 2007 and No. 2008-062696 filed on Mar. 12, 2008 including specification, drawings and claims is incorporated herein by reference in its entirety.

BACKGROUND

1. Technical Field

The invention relates to a lens array used in a line head, a line head for scanning a surface-to-be-scanned of a latent image carrier with light, and an image forming apparatus using the line head.

2. Related Art

A line head which scans light across a surface-to-be-scanned of a photosensitive member which is a latent image carrier to form a latent image is used as a light source for an electrophotographic printer which is an image forming apparatus. Among proposed as an LED (light emitting diode) print head which is a line head is one described in JP-A-2-4546 which uses a light emitting element group (that is, what is referred to as an "LED array chip" in JP-A-2-4546) which is formed by an arrangement of a plurality of LEDs which are light emitting elements. In JP-A-2-4546, one imaging lens focuses a plurality of luminous dot images on a photosensitive member. Known as a manufacturing method of a microlens array which is an imaging lens corresponding to an LED array chip includes a method of forming a mold by photolithography and electroforming and forming lenses on a glass substrate using a photoresist (JP-A-2005-276849). Also known is a method of forming microlens arrays on the both surfaces of a glass substrate (JP-A-6-208006).

SUMMARY

Light emitting element groups are arranged in a line head in such a manner that the longitudinal direction thereof is a main scanning direction. A long microlens array is necessary to cover the light emitting element groups. While a long mold is needed to form a long microlens array, it is difficult to accurately make a long mold which contains numerous lens molds corresponding to lenses. To be particularly noted, processing of the molds is usually machining with a sculptured surface processing machine when lens surfaces are shaped as aspheric surfaces. In this instance, the only way to form the lens molds is to finish the lens molds one by one, which demands a long processing time. To add to the difficulty, it is necessary to exchange a cutting or grinding tool during the processing and the accuracy of relative position of the lenses to each other worsens at the time of exchange.

An advantage of some aspects of the invention is to solve the problems above at least partially.

According to a first aspect of the invention, there is provided a lens array, comprising: a clear substrate; and a plurality of plastic lens substrates each of which includes a plurality of lenses and which are arranged on at least one of surfaces of the clear substrate.

According to a second aspect of the invention, there is provided a line head, comprising: a lens array which includes a clear substrate and a plurality of plastic lens substrates each of which includes a plurality of lenses and which are arranged on at least one of surfaces of the clear substrate; and a head substrate on which a plurality of light emitting element groups which are groups of a plurality of light emitting elements are arranged, wherein the lenses are arranged opposed to the light emitting element groups in the lens array, and light emitted from the light emitting element groups impinges upon the lenses and is imaged by an imaging optical system which includes the lenses.

According to a third aspect of the invention, there is provided an image forming apparatus, comprising: a latent image carrier; a lens array which includes a clear substrate and a plurality of plastic lens substrates each of which includes a plurality of lenses and which are arranged on at least one of surfaces of the clear substrate; and a head substrate on which a plurality of light emitting element groups which are groups of a plurality of light emitting elements are arranged, wherein the lenses are arranged opposed to the light emitting element groups in the lens array, and light emitted from the light emitting element groups impinges upon the lenses and is imaged by an imaging optical system which include the lenses to form spots on the surface of the latent image carrier.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DESCRIPTION OF EXEMPLARY EMBODIMENTS

Hereinafter, embodiments are described with reference to the drawings.

First Embodiment

Figure 1:
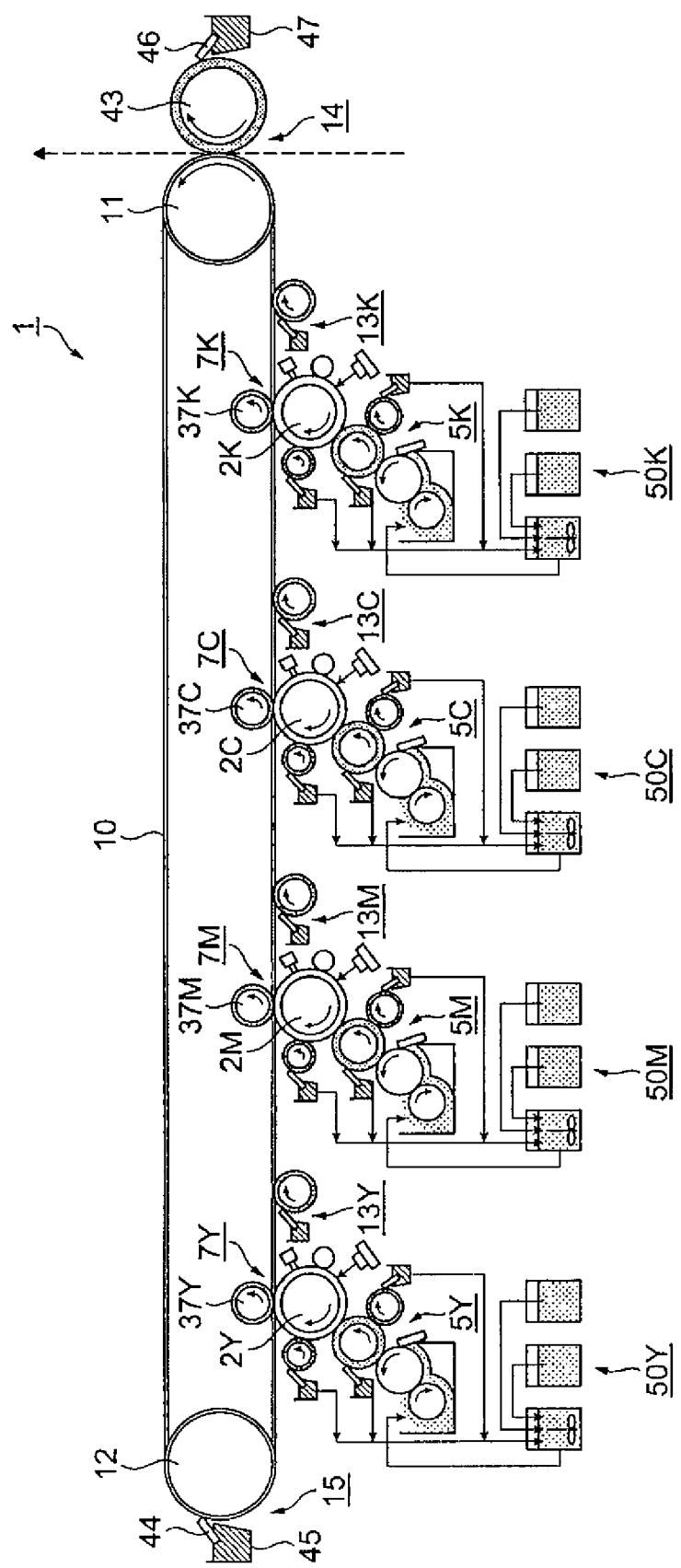
FIG. 1 is a diagram schematically and partly showing an image forming apparatus according to this embodiment.

FIG. 1 is a diagram schematically and partly showing an image forming apparatus 1 according to this embodiment. An image forming apparatus 1 is an apparatus for forming an image using a liquid developer, in which toner particles are dispersed in a liquid carrier. It should be noted that rotating directions are shown by solid-line arrows in rotational members.

In FIG. 1, the image forming apparatus 1 includes an endless intermediate transfer belt 10 as an intermediate transfer medium, a drive roller 11 and a driven roller 12 on which the intermediate transfer belt 10 is mounted, a secondary transfer device 14, an intermediate transfer belt cleaning device 15 and primary transfer units. The secondary transfer device 14 is disposed at a side of the intermediate transfer belt 10 toward the drive roller 11, and the intermediate transfer belt cleaning device 15 is disposed at a side of the intermediate transfer belt 10 toward the driven roller 12. The primary transfer units include primary transfer units 50Y, 50M, 50C and 50K corresponding to the respective colors of yellow (Y), magenta (M), cyan (C) and black (K). In the following description, Y, M, C and K indicating the respective colors are affixed to the reference numerals of devices, members and the like corresponding to the respective colors.

Although not shown, the image forming apparatus 1 includes a transfer material storage device for storing transfer materials such as sheets and a pair of rollers for feeding and conveying a transfer material from the transfer material storage device to the secondary transfer device 14 at a side upstream of the secondary transfer device 14 in a transfer material conveying direction similar to a conventional general image forming apparatus for performing a secondary transfer. In FIG. 1, the conveying direction of the transfer material is shown by a broken-line arrow. This image forming apparatus 1 also includes a fixing device and a discharge tray at a side downstream of the secondary transfer device 14 in the transfer material conveying direction.

In FIG. 1, the intermediate transfer belt 10 is so mounted between a pair of the drive roller 11 and the driven roller 12 spaced apart from each other as to rotate counterclockwise. This intermediate transfer belt 10 is preferably an elastic intermediate transfer belt in order to improve the transfer efficiency of the secondary transfer to transfer materials such as sheets. Although the respective primary transfer units 50Y, 50M, 50C and 50K are successively arranged in this order from an upstream side in the rotating direction of the intermediate transfer belt 10 in the image forming apparatus 1, the arrangement order of the colors Y, M, C and K can be arbitrarily set. It should be noted that the intermediate transfer belt 10 can be replaced by an intermediate transfer drum.

The secondary transfer device 14 includes a secondary transfer roller 43. This secondary transfer roller 43 is for bringing a transfer material such as a sheet into contact with the intermediate transfer belt 10 mounted on the drive roller 11 to transfer a color toner image, in which toner images of the respective colors are superimposed, on the intermediate transfer belt 10 to the transfer material. In this case, the drive roller 11 also functions as a backup roller at the time of secondary transfer. Further, the secondary transfer device 14 includes a secondary transfer roller cleaner 46 and a secondary transfer roller cleaner collection liquid storage container 47. The secondary transfer roller cleaner 46 is made of an elastic material such as rubber. This secondary transfer roller cleaner 46 is held in contact with the secondary transfer roller 43 to remove the liquid developer residual on the outer surface of the secondary transfer roller 43 after the secondary transfer by scraping the liquid developer off. The secondary transfer roller cleaner collection liquid storage container 47 collects and stores the liquid developer scraped off from the secondary transfer roller 43 by the secondary transfer roller cleaner 46.

The intermediate transfer belt cleaning device 15 includes an intermediate transfer belt cleaner 44 and an intermediate transfer belt cleaner collection liquid storage container 45. The intermediate transfer belt cleaner 44 is held in contact with the intermediate transfer belt 10 to remove the liquid developer residual on the surface of the intermediate transfer belt 10 by scraping it off after the secondary transfer. In this case, the driven roller 12 also functions as a backup roller at the time of cleaning the intermediate transfer belt. This intermediate transfer belt cleaner 44 is made of an elastic material such as rubber. The intermediate transfer belt cleaner collection liquid storage container 45 is for collecting and storing the liquid developer scraped off from the intermediate transfer belt 10 by the intermediate transfer belt cleaner 44.

The respective primary transfer units 50Y, 50M, 50C and 50K include corresponding developing devices 5Y, 5M, 5C and 5K, primary transfer devices 7Y, 7M, 7C and 7K, photosensitive members 2Y, 2M, 2C and 2K as latent image carriers arranged in series. Intermediate transfer belt squeezers 13Y, 13M, 13C and 13K are arranged near and downstream of the respective primary transfer devices 7Y, 7M, 7C and 7K in the rotating direction of the intermediate transfer belt 10.

Any of the respective photosensitive members 2Y, 2M, 2C and 2K is a photosensitive drum in the example shown in FIG. 1. Any of these photosensitive members 2Y, 2M, 2C and 2K is rotated clockwise as shown by solid-line arrows in FIG. 1 during the operation. It should be noted that the respective photosensitive members 2Y, 2M, 2C and 2K may be endless belts. The respective primary transfer devices 7Y, 7M, 7C and 7K include backup rollers 37Y, 37M, 37C and 37K for primary transfer for bringing the intermediate transfer belt 10 into contact with the respective photosensitive members 2Y, 2M, 2C and 2K.

The primary transfer units 50Y, 50M, 50C and 50K are described in detail below, taking the primary transfer unit 50Y as an example. The constituent parts of the primary transfer units 50M, 50C, 50K differ only in the respective colors M, C, K and the constructions and arrangements thereof are the same as those of the primary transfer unit 50Y.

Figure 2:
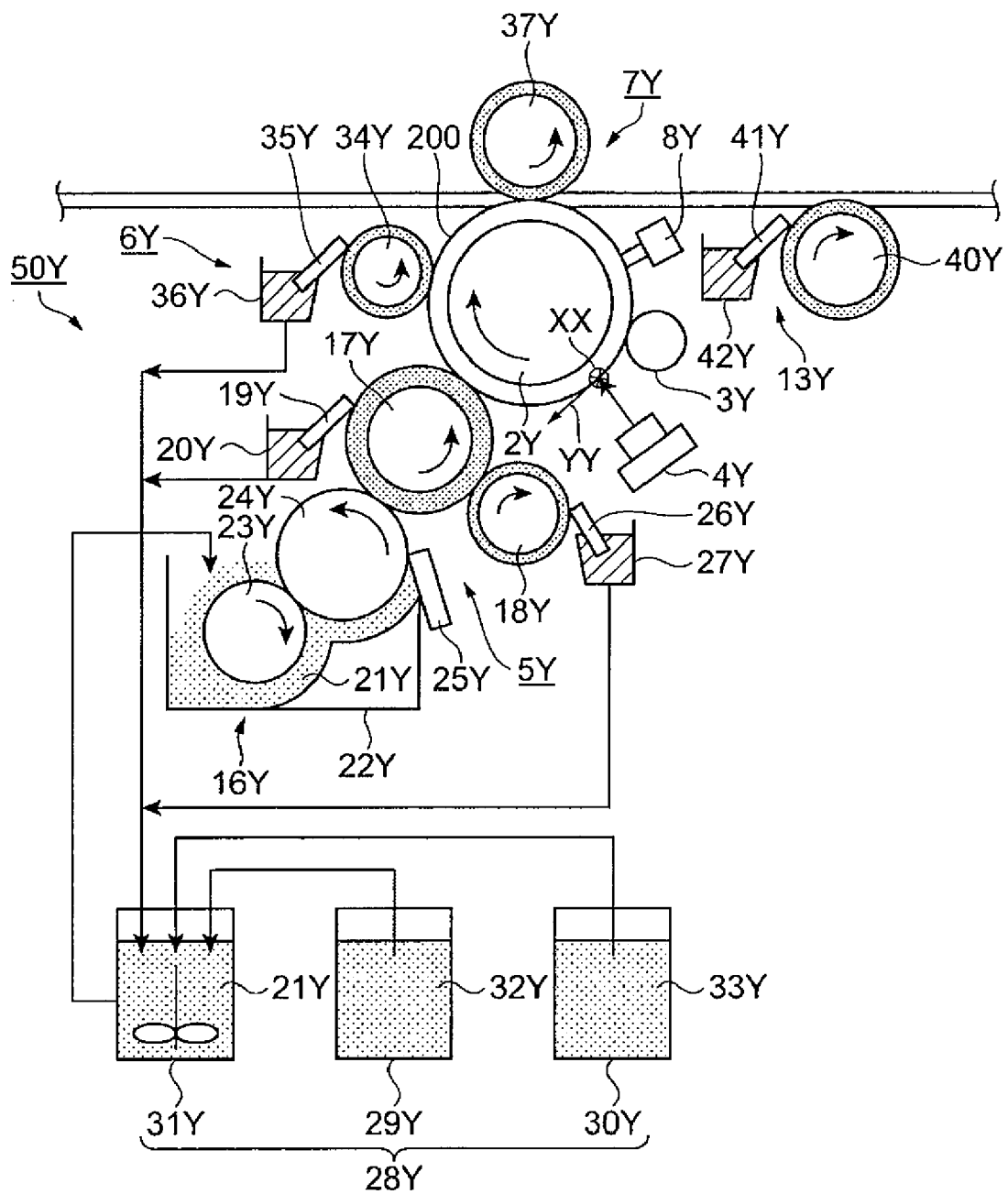
FIG. 2 is a schematic enlarged view of the primary transfer unit.

FIG. 2 is a schematic enlarged view of the primary transfer unit 50Y. Around the photosensitive member 2Y, a charging member 3Y, a line head 4Y as an exposing device, the developing device 5Y, a photosensitive member squeezer 6Y, the primary transfer device 7Y and a discharger 8Y are arranged in this order from an upstream side in the rotating direction.

The charging member 3Y is, for example, a charging roller. A bias having the same polarity as the charging polarity of the liquid developer is applied to the charging member 3Y from an unillustrated power supply. The charging member 3Y charges the photosensitive member 2Y. The line head 4Y forms an electrostatic latent image on the charged photosensitive member 2Y by exposing a surface 200 of the photosensitive member 2Y with light from an exposing optical system or the like using, for example, organic EL devices or LEDs. An incident direction of the light is shown by a solid-line arrow drawn from the line head 4Y. The line head 4Y is spaced apart from the photosensitive member 2Y. Scanning directions of the exposing optical system are defined such that a direction normal to the plane of FIG. 2 is a main scanning direction XX and a direction normal to the main scanning direction XX and tangent to the surface 200 of the photosensitive member 2Y to be exposed with the light is a sub scanning direction YY.

Figure 3:
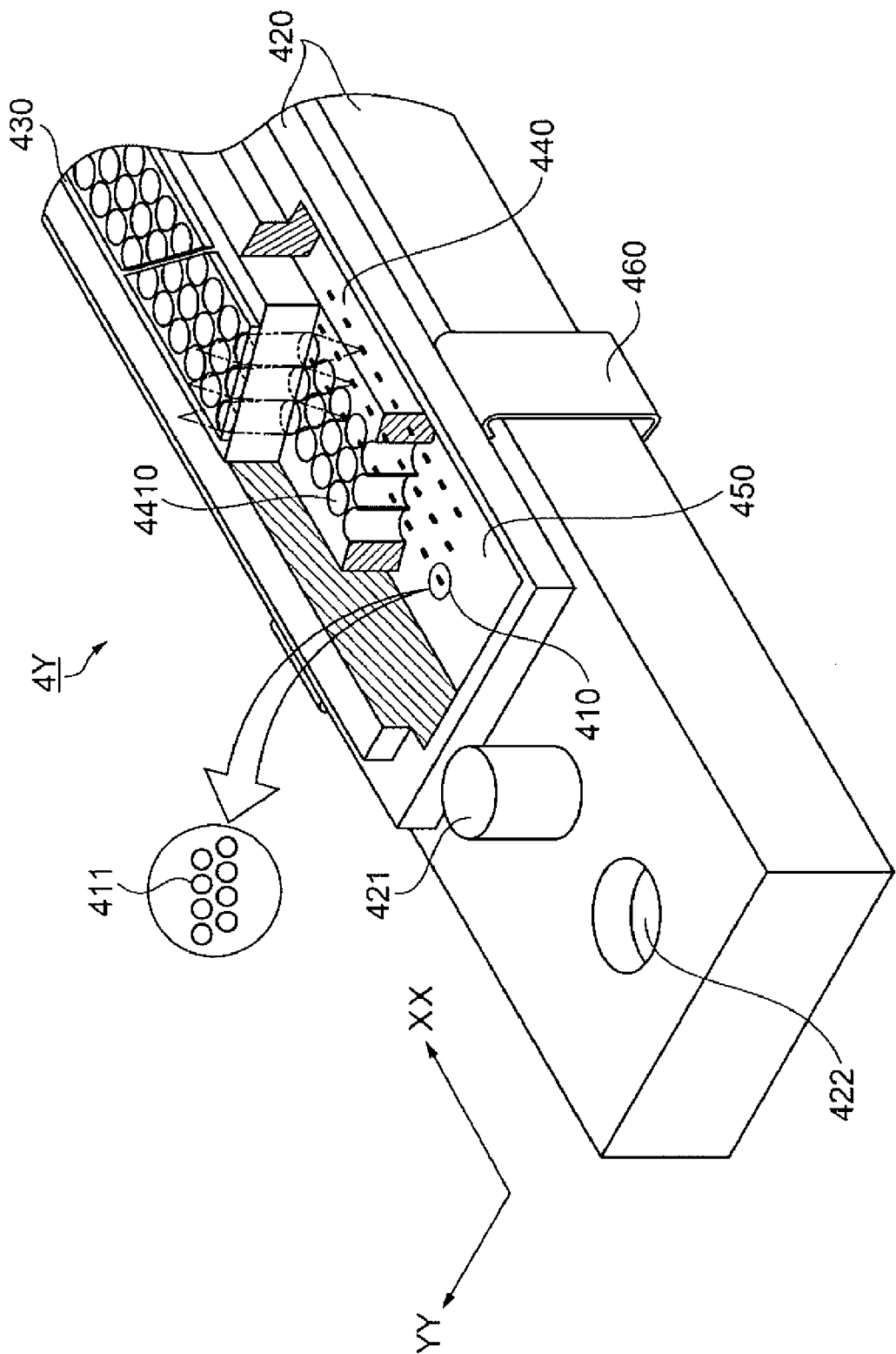
FIG. 3 is a perspective view schematically showing the line head according to this embodiment.
Figure 4:
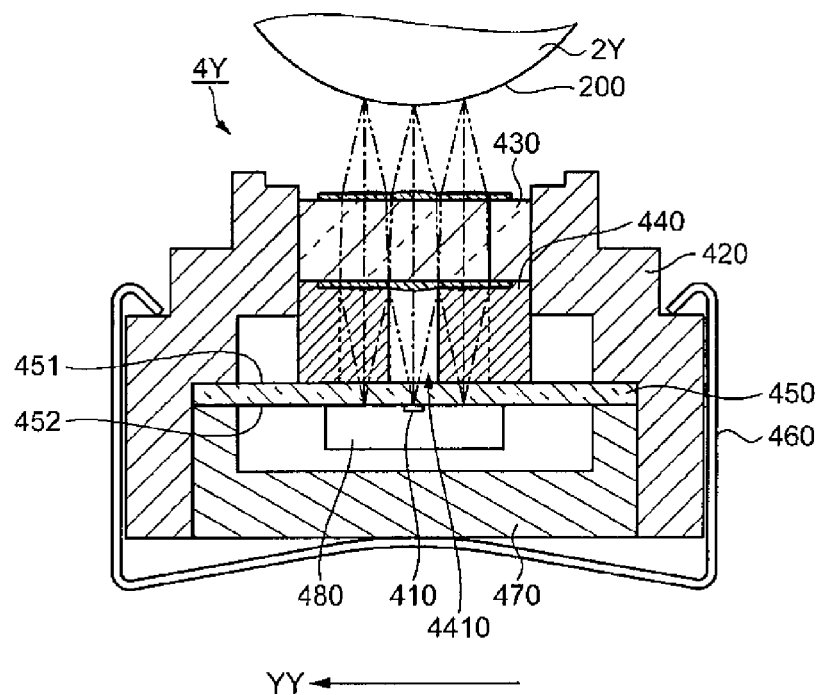
FIG. 4 is a sectional view of the line head in the sub scanning direction.

The line head 4Y according to this embodiment is described in detail below with reference to the drawings. FIG. 3 is a perspective view schematically showing the line head 4Y according to this embodiment, and FIG. 4 is a sectional view of the line head 4Y in the sub scanning direction YY. In FIG. 3, the line head 4Y includes light emitting element groups 410 aligned in the main scanning direction XX. Each light emitting element group 410 is comprised of a plurality of light emitting elements 411. Lights are emitted from these light emitting elements 411 to the surface 200 as a surface-to-be-scanned of the photosensitive member 2Y charged by the charging member 3Y as shown in FIG. 2, whereby an electrostatic latent image is formed on the surface 200.

In FIG. 3, the line head 4Y includes a case 420 whose longitudinal direction is the main scanning direction XX, and a positioning pin 421 and a screw insertion hole 422 are provided at each of the opposite ends of such a case 420. The line head 4Y is positioned relative to the photosensitive member 2Y shown in FIG. 2 by fitting such positioning pins 421 into positioning holes (not shown) perforated in an unillustrated photosensitive member cover. The photosensitive member cover covers the photosensitive member 2Y and is positioned relative to the photosensitive member 2Y. Further, the line head 4Y is positioned and fixed relative to the photosensitive member 2Y by screwing fixing screws into screw holes (not shown) of the photosensitive member cover via the screw insertion holes 422.

In FIGS. 3 and 4, the case 420 carries a microlens array 430, in which imaging lenses are arrayed, at a position facing the surface 200 of the photosensitive member 2Y, and is internally provided with a light shielding member 440 and a head substrate 450 as a substrate, the light shielding member 440 being closer to the microlens array 430 than the head substrate 450. The head substrate 450 is a clear glass substrate. A plurality of light emitting element groups 410 are provided on an under surface 452 of the head substrate 450 (surface opposite to a top surface 451 facing the light shielding member 440 out of two surfaces of the head substrate 450). The plurality of light emitting element groups 410 are two-dimensionally arranged on the under surface 452 of the head substrate 450 while being spaced by specified distances in the main scanning direction XX and the sub scanning direction YY as shown in FIG. 3. Here, the light emitting element group 410 is formed by two-dimensionally arraying a plurality of light emitting elements 411 as shown in an encircled part in FIG. 3.

In this embodiment, organic EL devices are used as the light emitting elements. In other words, the organic EL devices are arranged as light emitting elements 411 on the under surface 452 of the head substrate 450 in this embodiment. Lights emitted from the respective plurality of light emitting elements 411 in directions toward the photosensitive member 2Y propagate toward the light shielding member 440 via the head substrate 450. The light emitting elements may be LEDs. In this case, the substrate may not be a glass substrate and the LEDs can be provided on the top surface 451.

In FIGS. 3 and 4, the light shielding member 440 includes a plurality of light guide holes 4410 in a one-to-one correspondence with the plurality of light emitting element groups 410.

In FIGS. 3 and 4, lights emitted from the light emitting elements 410 belonging to the light emitting element group 410 are introduced to the microlens array 430 through the light guide holes 4410 in a one-to-one correspondence with the light emitting element group 410. The lights having passed through the light guide holes 4410 are imaged as spots on the surface 200 of the photosensitive member 2Y by the microlens array 430 as shown by chain double-dashed line.

As shown in FIG. 4, an underside lid 470 is pressed against the case 420 via the head substrate 450 by retainers 460. Specifically, the retainers 460 have elastic forces to press the underside lid 470 toward the case 420, and seal the inside of the case 420 light-tight (that is, so that light does not leak from the inside of the case 420 and so that light does not intrude into the case 420 from the outside) by pressing the underside lid 470 by means of the elastic forces. It should be noted that a plurality of the retainers 460 are provided at a plurality of positions in the longitudinal direction of the case 420 shown in FIG. 3. The light emitting element groups 410 are covered with a sealing member 480.

Figure 5:
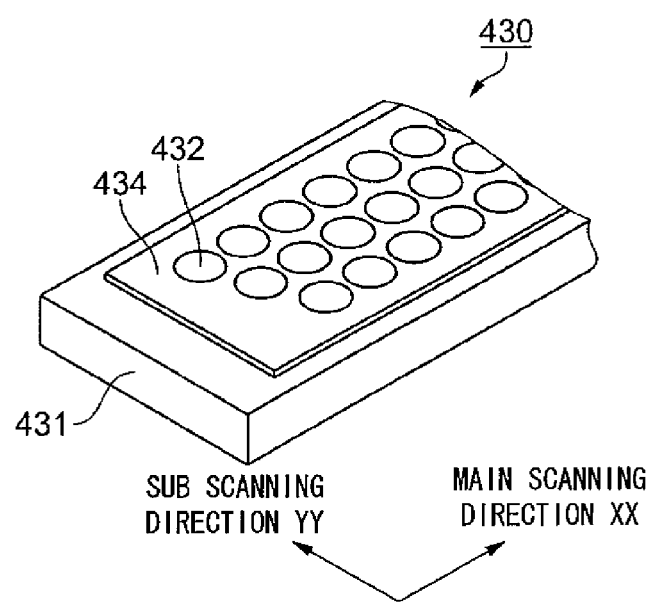
FIG. 5 is a schematic partial perspective view of the microlens array.
Figure 6:
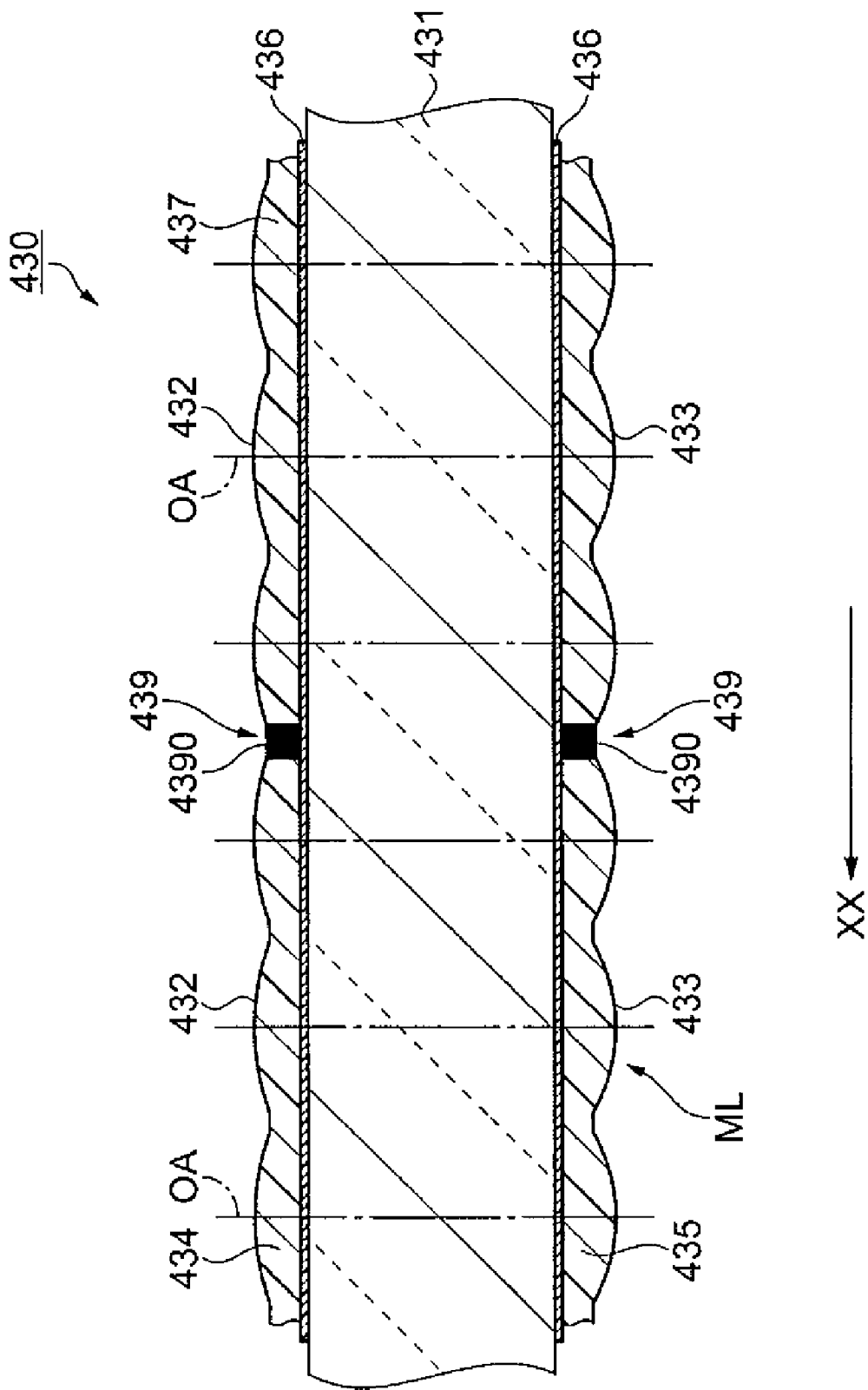
FIG. 6 is a partial cross sectional view of the microlens array taken in the main scanning direction.
Figure 7:
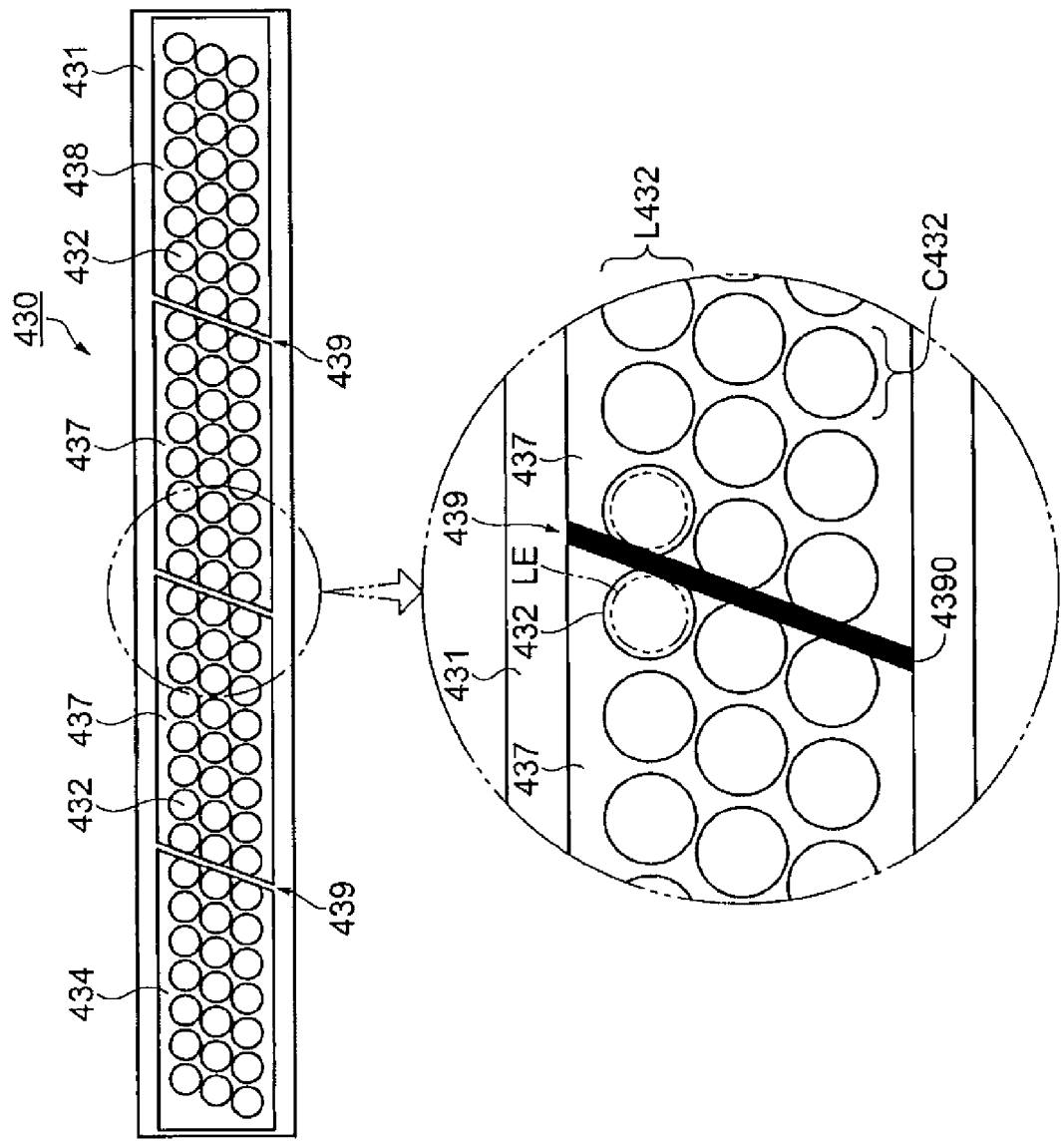
FIG. 7 is a plan view of the microlens array.

FIG. 5 is a schematic partial perspective view of the microlens array 430. FIG. 6 is a partial cross sectional view of the microlens array 430 taken in the main scanning direction XX. FIG. 7 is a plan view of the microlens array 430. In FIGS. 5 and 6, the microlens array 430 comprises a glass substrate 431 which serves as a clear substrate and plastic lens substrates 434 and 435. These drawings are partial views and do not show all components. In FIG. 7, the microlens array 430 comprises the glass substrate 431 and plastic lens substrates 434, 437 and 438.

In FIGS. 5 and 6, the plastic lens substrates 434 and 435 are provided on the both surfaces of the glass substrate 431. A plurality of lenses 432 are formed on the plastic lens substrate 434, and a plurality of lenses 433 are formed on the plastic lens substrate 435. The plastic lens substrates 434, 435 and the lenses 432, 433 can be formed as one integrated structure by injection molding of a resin. The two lenses 432 and 433 disposed on a one-to-one correspondence with each other sandwiching the glass substrate 431 constitute a lens pair.

In FIG. 6, the plastic lens substrate 434 is adhered to one surface of the glass substrate 431 and the plastic lens substrate 435 is adhered to the opposed surface, both by an adhesive 436. While the adhesive 436 may be an ultraviolet cure adhesive, a thermosetting adhesive or the like, considering alignment of the glass substrate 431 to the plastic lens substrate 434, etc., an ultraviolet cure adhesive which hardens to UV light after alignment is preferable.

The two lenses 432, 433 constituting the lens pair share an optical axis OA shown by dashed-dotted line in FIG. 6. These plurality of lens pairs are arranged in a one-to-one correspondence with the plurality of light emitting element groups 410 shown in FIG. 3. In this specification, an optical system made up of a one-to-one pair of lenses 432 and 433 and the glass substrate 431 located between such lens pair is called a "microlens ML". The microlenses ML as imaging lenses are two-dimensionally arranged in conformity with the arrangement of the light emitting element groups 410 while being spaced apart by specified distances in the main scanning direction XX and the sub scanning direction YY.

In FIG. 7, the microlens array 430 is shaped as a rectangle when viewed in a plan view. On one surface of the microlens array 430, the plastic lens substrates 434, 437 and 438 are arranged and adhered side by side in the longitudinal direction. On the back surface as well, plastic lens substrates not shown corresponding to the plastic lens substrates 437 and 438 and other than the plastic lens substrate 435 shown in FIG. 6 are adhered. The plastic lens substrate 434 and the plastic lens substrate 438 are located at the both longitudinal-direction ends of the glass substrate 431, and the two plastic lens substrates 437 are disposed between the plastic lens substrate 434 and the plastic lens substrate 438. The two plastic lens substrates 437 are each shaped as a parallelogram, and there are gaps 439 provided between the four plastic lens substrates 434, 437 and 438. In FIGS. 6 and 7, the gaps 439 may be filled with a light absorbing material 4390. The light absorbing material 4390 may be a resin containing carbon microparticles, etc.

Shown in the circle in FIG. 7 is an enlarged view of a vicinity of the gap 439. The lenses 432 are arranged forming three lens rows L432 in the longitudinal direction of the microlens array 430. These rows are slightly shifted from each other in the longitudinal direction. Lens columns C432 are arranged at an angle with respect to the shorter sides of the rectangle which the microlens array 430 defines in a plan view. The gaps 439 are formed between the lens columns C432 and along the lens columns C432. Further, the gaps 439 are provided so as not to stretch over the lens effective ranges LE of the lenses 432. The effective range LE of a lens is an area which transmits light emitted from the corresponding light emitting element group 410 shown in FIG. 4. A method of forming the gaps 439 such that they do not interfere with the effective ranges LE of the lenses includes the followings. A method of forming edge surfaces of the plastic lens substrates which will later define the gaps 439 in such a manner that they do not intrude into the effective ranges LE of the lenses. Further, a method of forming the plurality of plastic lens substrates as one integrated structure and cutting the structure so that the resulting gaps do not extend into the effective ranges LE of the lenses.

Figure 8:
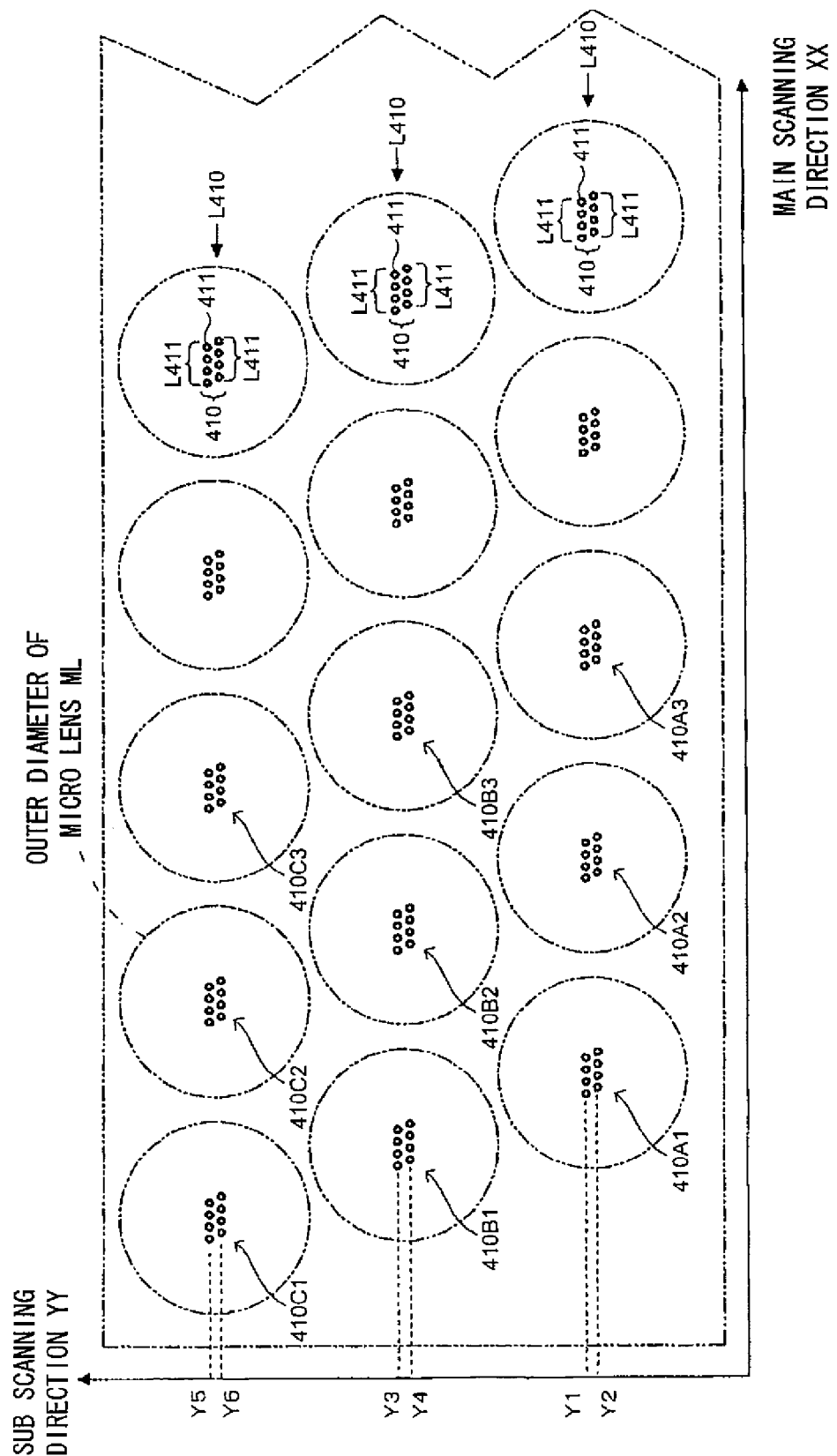
FIG. 8 is a diagram showing the arrangement of the plurality of light emitting elements.

FIG. 8 is a diagram showing the arrangement of the plurality of light emitting elements 410. In this embodiment, two light emitting element rows L411, in each of which four light emitting elements 411 are aligned at specified intervals in the main scanning direction XX, are arranged in the sub scanning direction YY to form one light emitting element group 410. In other words, eight light emitting elements 411 constitute the light emitting element group 410 corresponding to a position of the outer diameter of one microlens ML shown by a chain double-dashed line circle in FIG. 7. A plurality of light emitting element groups 410 are arranged as follows.

The light emitting element groups 410 are two-dimensionally arranged such that three light emitting element group rows L410 (group rows), in each of which a specified number (two or larger) of light emitting element groups 410 are aligned in the main scanning direction XX, are arranged in the sub scanning direction YY. The light emitting element groups 410 in each of the light emitting element group rows L410 are arranged at mutually different main scanning direction positions. Further, the plurality of light emitting element groups 410 are arranged such that the light emitting element groups (light emitting element groups 410C1, 410B1 for instance) adjacent in the main scanning direction mutually differ in their sub scanning direction positions. The main scanning direction position and the sub scanning direction position mean a main scanning direction component and a sub scanning direction component of a target position, respectively.

Figure 9:
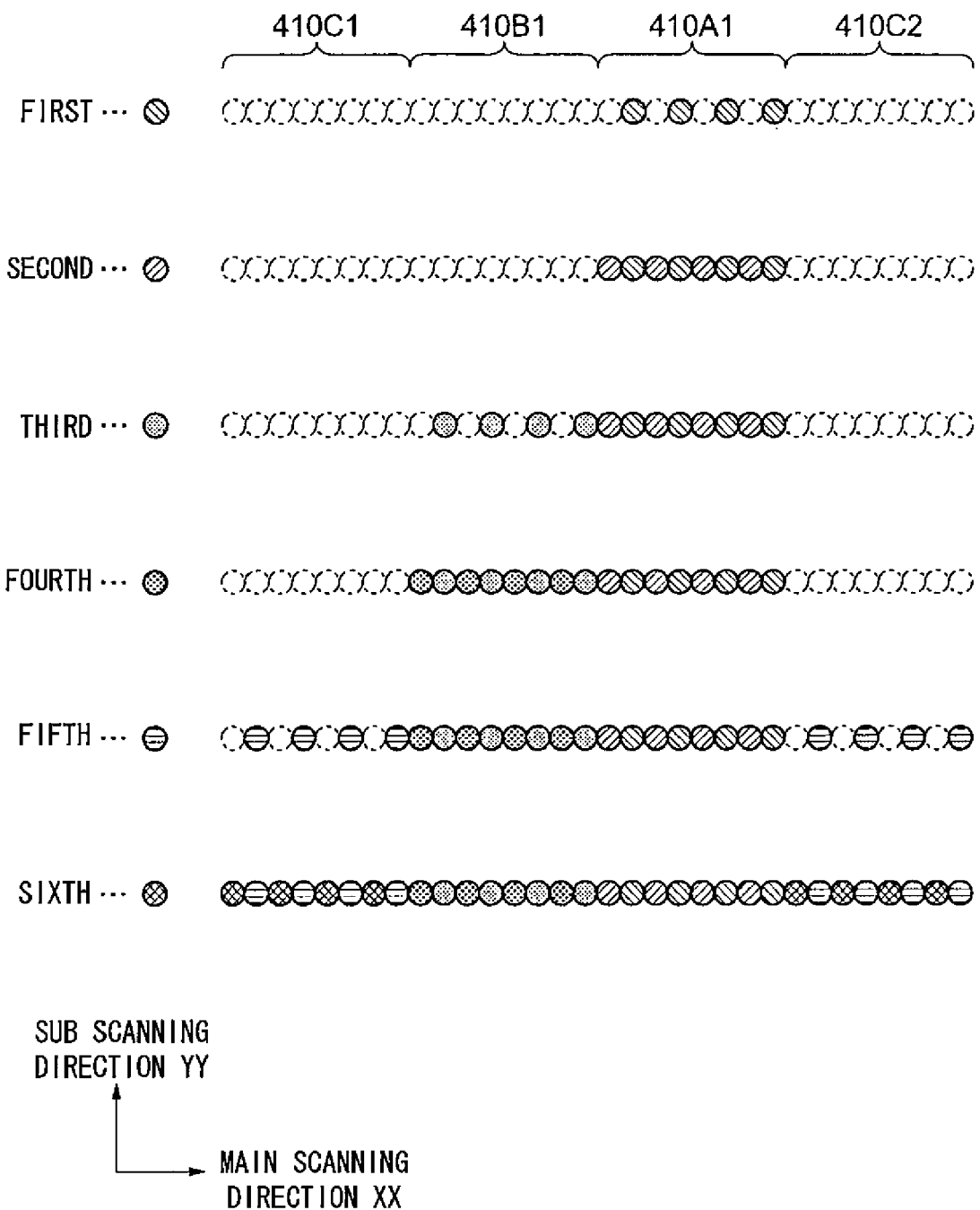
FIG. 9 is a diagram showing a spot forming operation by the line head.

FIG. 9 is a diagram showing a spot forming operation by the line head 4Y. An electrostatic latent image is formed by a collection of spots. The spot forming operation by the line head according to this embodiment is described with reference to FIGS. 8 and 9. In order to facilitate the understanding of the invention, here is described the case where a plurality of spots are aligned on a straight line extending in the main scanning direction XX. In this embodiment, the plurality of spots are formed side by side on the straight line extending in the main scanning direction XX by driving a plurality of light emitting elements 411 to emit lights at specified timings while the surface 200 of the photosensitive member 2Y is conveyed in the sub scanning direction YY.

In FIG. 8, six light emitting element rows L411 are arranged in the sub scanning direction YY corresponding to sub scanning direction positions Y1 to Y6 in the line head 4Y of this embodiment. The light emitting element rows L411 located at the same sub scanning direction position are driven to emit lights substantially at the same timing, and those located at positions different in the sub scanning direction YY are driven to emit lights at mutually different timings. More specifically, the light emitting element rows L411 are driven to emit lights in an order of the sub scanning direction positions Y1 to Y6. By driving the light emitting element rows L411 to emit lights in the above order while the surface 200 of the photosensitive member 2Y is conveyed in the sub scanning direction YY, the plurality of spots are formed side by side on the straight line extending in the main scanning direction XX of the surface 200.

Such an operation is described with reference to FIGS. 8 and 9. First of all, the light emitting elements 411 of the light emitting element rows L411 at the sub scanning direction position Y1 belonging to the most upstream light emitting element groups 410A1, 410A2, 410A3, . . . in the sub scanning direction YY are driven to emit lights. A plurality of lights emitted by such a light emitting operation are imaged on the surface 200 of the photosensitive member 2Y by the microlenses ML, which are "imaging lenses" having the aforementioned inverting and reducing property, while being inverted and reduced. In other words, spots are formed at hatched positions of the "first" of FIG. 9. In FIG. 9, white circles represent spots that are not formed yet, but planned to be formed later. In FIG. 9, spots labeled by reference numerals 410C1, 410B1, 410A1 and 410C2 are those to be formed by the light emitting element groups 410 corresponding to the respective attached reference numerals.

Subsequently, the light emitting elements 411 of the light emitting element rows L411 at the sub scanning direction position Y2 belonging to the same light emitting element groups 410A1, 410A2, 410A3, . . . are driven to emit lights. A plurality of lights emitted by such a light emitting operation are imaged on the surface 200 of the photosensitive member 2Y by the microlenses ML while being inverted and reduced. In other words, spots are formed at hatched positions of the "second" of FIG. 9. Here, whereas the surface 200 of the photosensitive member 2Y is conveyed in the sub scanning direction YY, the light emitting element rows L411 are successively driven to emit lights from the downstream ones in the sub scanning direction YY (i.e. in the order of the sub scanning direction positions Y1, Y2). This is to deal with the inverting property of the microlenses LS.

Subsequently, the light emitting elements 411 of the light emitting element rows L411 at the sub scanning direction position Y3 belonging to the second most upstream light emitting element groups 410B1, 410B2, 410B3, . . . in the sub scanning direction YY are driven to emit lights. A plurality of lights emitted by such a light emitting operation are imaged on the surface 200 of the photosensitive member 2Y by the microlenses ML while being inverted and reduced. In other words, spots are formed at hatched positions of the "third" of FIG. 9.

Subsequently, the light emitting elements 411 of the light emitting element rows L411 at the sub scanning direction position Y4 belonging to the same light emitting element groups 4103B1, 410B2, 410B3, . . . are driven to emit lights. A plurality of lights emitted by such a light emitting operation are imaged on the surface 200 of the photosensitive member 2Y by the microlenses LS while being inverted and reduced. In other words, spots are formed at hatched positions of the "fourth" of FIG. 9.

Subsequently, the light emitting elements 411 of the light emitting element rows L411 at the sub scanning direction position Y5 belonging to the most downstream light emitting element groups 410C1, 410C2, 410C3, . . . in the sub scanning direction YY are driven to emit lights. A plurality of lights emitted by such a light emitting operation are imaged on the surface 200 of the photosensitive member 2Y by the microlenses ML while being inverted and reduced. In other words, spots are formed at hatched positions of the "fifth" of FIG. 9.

Finally, the light emitting elements 411 of the light emitting element rows L411 at the sub scanning direction position Y6 belonging to the same light emitting element groups 410C1, 410C2, 410C3, . . . are driven to emit lights. A plurality of lights emitted by such a light emitting operation are imaged on the surface 200 of the photosensitive member 2Y by the microlenses ML while being inverted and reduced. In other words, spots are formed at hatched positions of the "sixth" of FIG. 9. By performing the first to sixth light emitting operations in this way, a plurality of spots are formed while being aligned on the straight line extending in the main scanning direction XX.

Next, referring back to FIG. 2, the developing device 5Y is described. The developing device 5Y develops an electrostatic latent image formed on the photosensitive member 2Y with a liquid developer 21Y. In FIG. 2, the developing device 5Y includes a developer supplier 16Y, a developing roller 17Y, a compaction roller 18Y, a developing roller cleaner 19Y and a developing roller cleaner collection liquid storage container 20Y.

The developer supplier 16Y includes a developer container 22Y for storing the liquid developer 21Y comprised of toner particles and a nonvolatile liquid carrier, a developer scoop-up roller 23Y, an anilox roller 24Y and a developer restricting blade 25Y.

In the liquid developer 21Y stored in the developer container 22Y, particles having, for example, an average particle diameter of 1 μm and obtained by dispersing a known colorant such as pigment in a likewise known thermoplastic resin used for toner can be used as toner particles. In order to obtain a liquid developer having a low viscosity and a low density, insulating liquid carrier including, for instance, an organic solvent, a silicone oil having an ignition point of 210 degrees centigrade or higher such as phenyl methyl siloxane, dimethyl polysiloxane and polydimethyl cyclosiloxane, and a mineral oil can be used as the liquid carrier. The liquid developer 21Y is obtained by adding the toner particles into the liquid carrier together with a dispersant in such a manner as to have a toner solid concentration of about 20%.

The developer scoop-up roller 23Y is a roller for scooping up the liquid developer 21Y in the developer container 22Y and supplying it to the anilox roller 24Y. The developer scoop-up roller 23Y is rotated clockwise as shown by an arrow in FIG. 2. The anilox roller 24Y is a cylindrical member having fine spiral grooves uniformly formed on the outer surface thereof. The grooves are, for example, dimensioned such that the groove pitch is about 130 μm and the groove depth is about 30 μm. Of course, the dimensions of the grooves are not limited to these values. The anilox roller 24Y is rotated counterclockwise as shown by an arrow in FIG. 2 in the same direction as the developing roller 17Y. The anilox roller 24Y may be rotated clockwise, following the rotation of the developing roller 17Y. In other words, the rotating direction of the anilox roller 24Y can be arbitrarily set without being limited.

The developer restricting blade 25Y is disposed in contact with the outer surface of the anilox roller 24Y. The developer restricting blade 25Y is comprised of a rubber portion made of a urethane rubber or the like and held in contact with the outer surface of the anilox roller 24Y and a plate made of a metal or the like for supporting the rubber portion. The developer restricting blade 25Y removes the liquid developer 21Y adhering to the outer surface of the anilox roller 24Y excluding the grooves by scraping it off with the rubber portion. Accordingly, the anilox roller 24Y supplies only the liquid developer 21Y adhering in the grooves to the developing roller 17Y.

The developing roller 17Y is comprised of a metallic shaft made of an iron for instance, and a cylindrical electrically conductive elastic member having a specified width and including an electrically conductive resin or rubber layer made of an electrically conductive urethane rubber and the like which is mounted on the outer circumferential surface of the metallic shaft. The developing roller 17Y is held in contact with the photosensitive member 2Y and rotated counterclockwise as shown by an arrow in FIG. 2.

The compaction roller 18Y is so arranged as to hold the outer circumferential surface thereof in contact with the outer circumferential surface of the developing roller 17Y. At this time, the compaction roller 18Y and the developing roller 17Y bite each other by a specified amount.

The compaction roller 18Y is rotated clockwise as shown by an arrow in FIG. 2. The compaction roller 18Y has a voltage applied thereto to charge the developing roller 17Y. In this case, a direct-current voltage (DC) is set as the voltage applied to the compaction roller 18Y. A voltage obtained by superposing an alternating-current voltage (AC) on a direct-current voltage (DC) may be set as the voltage applied to the compaction roller 18Y.

By charging the developing roller 17 with the compaction roller 18Y, the compaction roller 18Y applies a contact compaction to the liquid developer 21Y on the developing roller 17Y.

By the contact compaction by the compaction roller 18Y, the liquid developer 21Y on the developing roller 17Y is pressed against the developing roller 17Y.

The compaction roller 18Y includes a compaction roller cleaner blade 26Y and a compaction roller cleaner collection liquid storage container 27Y. The compaction roller cleaner blade 26Y is made of, for example, rubber or the like held in contact with the outer surface of the compaction roller 18Y and removes the liquid developer 21Y residual on the compaction roller 18Y by scraping it off. The compaction roller cleaner collection liquid storage container 27Y includes a container such as a tank for storing the liquid developer 21Y scraped off from the compaction roller 18Y by the compaction roller cleaner blade 26Y.

The developing roller cleaner 19Y is made of, for example, rubber or the like held in contact with the outer surface of the developing roller 17Y and removes the liquid developer 21Y residual on the developing roller 17Y by scraping it off. The developing roller cleaner collection liquid storage container 20Y includes a container such as a tank for storing the liquid developer 21Y scraped off from the developing roller 17Y by the developing roller cleaner 19Y.

The image forming apparatus 1 further includes a developer replenishing device 28Y for replenishing the liquid developer 21Y into the developer container 22Y. The developer replenishing device 28Y includes a toner tank 29Y, a carrier tank 30Y and an agitator 31Y.

A high-concentration liquid toner 32Y is stored in the toner tank 29Y, and a liquid carrier (carrier oil) 33Y is stored in the carrier tank 30Y. A specified amount of the high-concentration liquid toner 32Y from the toner tank 29Y and a specified amount of the liquid carrier 33Y from the carrier tank 30Y are supplied to the agitator 31Y.

The agitator 31Y mixes and agitates the supplied high-concentration liquid toner 32Y and liquid carrier 33Y to produce the liquid developer 21Y to be used in the developing device 5Y. In this case, it is preferable that the viscosity of the entire liquid developer 21Y is 100 mPas to 1000 mPas and that the viscosity of the liquid carrier (carrier oil) alone is 10 mPas to 200 mPas. The viscosity is measured using, for example, a viscoelasticity measuring apparatus ARES (manufactured by T A Instruments, Japan). The liquid developer 21Y produced by the agitator 31Y is supplied to the developer container 22Y.

The photosensitive member squeezer 6Y includes a squeeze roller 34Y, a squeeze roller cleaner 35Y and a squeeze roller cleaner collection liquid storage container 36Y. The squeeze roller 34Y is disposed downstream of a contact portion (nip portion) of the photosensitive member 2Y and the developing roller 17Y in the rotating direction of the photosensitive member 2Y. The squeeze roller 34Y is rotated in a direction (counterclockwise in FIG. 2) opposite to the rotating direction of the photosensitive member 2Y to remove the liquid developer 21Y on the photosensitive member 2Y.

The liquid developer 21Y stored in the compaction roller cleaner collection liquid storage container 27Y, the developing roller cleaner collection liquid storage container 20Y and the squeeze roller cleaner collection liquid storage container 36Y is returned back to the agitator 31Y and re-used.

An elastic roller having an elastic member such as an electrically conductive urethane rubber and a fluororesin surface layer provided on the outer surface of a metallic core is suitably used as the squeeze roller 34Y. The squeeze roller cleaner 35Y is made of an elastic body such as rubber and held in contact with the surface of the squeeze roller 34Y to remove the liquid developer 21Y residual on the squeeze roller 34Y by scraping it off. The squeeze roller cleaner collection liquid storage container 36Y is a container such as a tank for storing the liquid developer 21Y scraped off by the squeeze roller cleaner 35Y.

A voltage of about −200 V having a polarity opposite to the charging polarity of the toner particles is applied to the backup roller 37Y to primarily transfer an image formed on the photosensitive member 2Y with the liquid developer 21Y to the intermediate transfer belt 10. Further, the discharger 8Y removes electric charges residual on the photosensitive member 2Y after the primary transfer.

The intermediate transfer belt squeezer 13Y includes an intermediate transfer belt squeeze roller 40Y, an intermediate transfer belt squeeze roller cleaner 41Y and an intermediate transfer belt squeeze roller cleaner collection liquid storage container 42Y. The intermediate transfer belt squeeze roller 40Y collects the liquid developer 21Y on the intermediate transfer belt 10. The intermediate transfer belt squeeze roller cleaner 41Y scrapes off the collected liquid developer 21Y on the intermediate transfer belt squeeze roller 40Y. The intermediate transfer belt squeeze roller cleaner 41Y is made of an elastic material such as rubber similar to the squeeze roller cleaner 35Y. The intermediate transfer belt squeeze roller cleaner collection liquid storage container 42Y collects and stores the liquid developer 21Y scrapped off by the intermediate transfer belt squeeze roller cleaner 41Y.

When an image forming operation is started, the photosensitive member 2Y is uniformly charged by the charging member 3Y. Subsequently, an electrostatic latent image is formed on the photosensitive member 2Y by the line head 4Y. Subsequently, in the developing device 5Y, the liquid developer 21Y of yellow (Y) is scooped up to the anilox roller 24Y by the developer scoop-up roller 23Y. A proper amount of the liquid developer 21Y adhering to the anilox roller 24Y is caused to adhere in the grooves of the anilox roller 24Y by the developer restricting blade 25Y. The liquid developer 21Y in the grooves of the anilox roller 24Y is supplied to the developing roller 17Y.

At this time, a part of the liquid developer 21Y in the grooves of the anilox roller 24Y moves toward the opposite left and right ends of the anilox roller 24Y. Further, the yellow (Y) toner particles of the liquid developer 21Y on the developing roller 17Y are pressed against the developing roller 17Y by the contact compaction by the compaction roller 18Y. The liquid developer 21Y on the developing roller 17Y is conveyed toward the photosensitive member 2Y by the rotation of the developing roller 17Y while being compacted.

After completing the contact compaction by the compaction roller 18Y, the liquid developer 21Y residual on the compaction roller 18Y is removed from the compaction roller 18Y by the compaction roller cleaner blade 26Y.

The electrostatic latent image formed on the photosensitive member 2Y of yellow (Y) is developed with the liquid developer 21Y of yellow (Y) in the developing device 5Y, whereby an image is formed on the photosensitive member 2Y with the liquid developer 21Y of yellow (Y). After completing the image development, the liquid developer 21Y residual on the developing roller 17Y is removed from the developing roller 17Y by the developing roller cleaner 19Y. The image formed with the liquid developer 21Y of yellow (Y) on the photosensitive member 2Y is formed into a yellow (Y) toner image by collecting the liquid developer 21Y on the photosensitive member 2Y by means of the squeeze roller 34Y. Further, this yellow (Y) toner image is transferred to the intermediate transfer belt 10 by the primary transfer device 7Y. The yellow (Y) toner image on the intermediate transfer belt 10 is conveyed toward the primary transfer device 7M of magenta (M) shown in FIG. 1 while the liquid developer 21Y on the intermediate transfer belt 10 is collected by the intermediate transfer belt squeeze roller 40Y.

In FIG. 1, an electrostatic latent image formed on the photosensitive member 2M of magenta (M) is subsequently developed with a magenta (M) liquid developer conveyed as in the case of yellow (Y) in the developing device 5M, whereby an image is formed with the magenta (M) liquid developer on the photosensitive member 2M. At this time, the carrier residual on a compaction roller 18M after the completion of the contact compaction by the compaction roller 18M is removed from the compaction roller 18M by a compaction roller cleaner blade 26M. Further, the liquid developer residual on the developing roller 17M after the completion of the image development is removed from the developing roller 17M by a developing roller cleaner 19M.

The image formed with the liquid developer of magenta (M) on the photosensitive member 2M is formed into a magenta (M) toner image by the liquid developer on the photosensitive member 2M being collected by means of the squeeze roller 34M. This magenta (M) toner image is transferred to the intermediate transfer belt 10 in the primary transfer device 7M while being superimposed on the yellow (Y) toner image. Similarly, the superimposed yellow (Y) and magenta (M) toner images are conveyed toward the primary transfer device 7C of cyan (C) while the liquid developer on the intermediate transfer belt 10 is collected by the intermediate transfer belt squeeze roller 40M. Hereinafter, a cyan (C) toner image and a black (K) toner image are successively similarly transferred in a superimposed manner to the intermediate transfer belt 10, whereby a full color toner image is formed on the intermediate transfer belt 10.

Subsequently, the color toner image on the intermediate transfer belt 10 is secondarily transferred to a transfer surface of a transfer material such as a sheet by the secondary transfer device 14. The color toner image transferred to the transfer material is fixed as before by an unillustrated fixing device, and the transfer material having the full color fixed image formed thereon is conveyed to a discharge tray, whereby the color image forming operation is completed.

The embodiment described above promises the following effects.

(1) Since the microlens array 430 is constructed by arranging the plurality of plastic lens substrates 434, 437 and 438 side by side, each of the plastic lens substrates 434, 437 and 438 can be short. This enables size reduction of the mold for forming the plastic lens substrates 434, 437 and 438, which makes it possible to lower the manufacturing cost and to obtain the microlens array 430 in which the accuracy of relative position of the lenses is improved. The line heads 4Y, 4M, 4C and 4K and the image forming apparatus 1 using this as well benefit from similar effects. Further, the gaps 439 can absorb distortion with a temperature change attributable to a difference between the coefficient of thermal expansion of the plastic lens substrates 434, 437 and 438 and that of the glass substrate 431, which improves the accuracy of relative position of the lenses regardless of a temperature change within the microlens array 430.

(2) The plastic lens substrates 434, 435, 437 and 438 and the like are arranged and adhered to the both surfaces of the glass substrate 431. Hence, the so-called bimetal effect can be hard to occur even when there is a large difference between the coefficient of linear expansion of glass and that of plastics, which ensures that the accuracy of relative position of the lenses is improved in the microlens array 430.

(3) Since the gaps 439 are filled with the light absorbing material 4390, it is possible to suppress scattering of light at the interfaces between the gaps 439 and the plastic lens substrates 434, 437 and 438. It is therefore possible to obtain the microlens array 430 which gives rise to less stray light.

(4) Since the gaps 439 are formed as if to notch the lenses but only to the extent not intruding into the effective ranges LE of the lenses, the aperture of the lenses can be large to increase the amount of light which the microlenses ML transmit.

Second Embodiment

Figure 10:
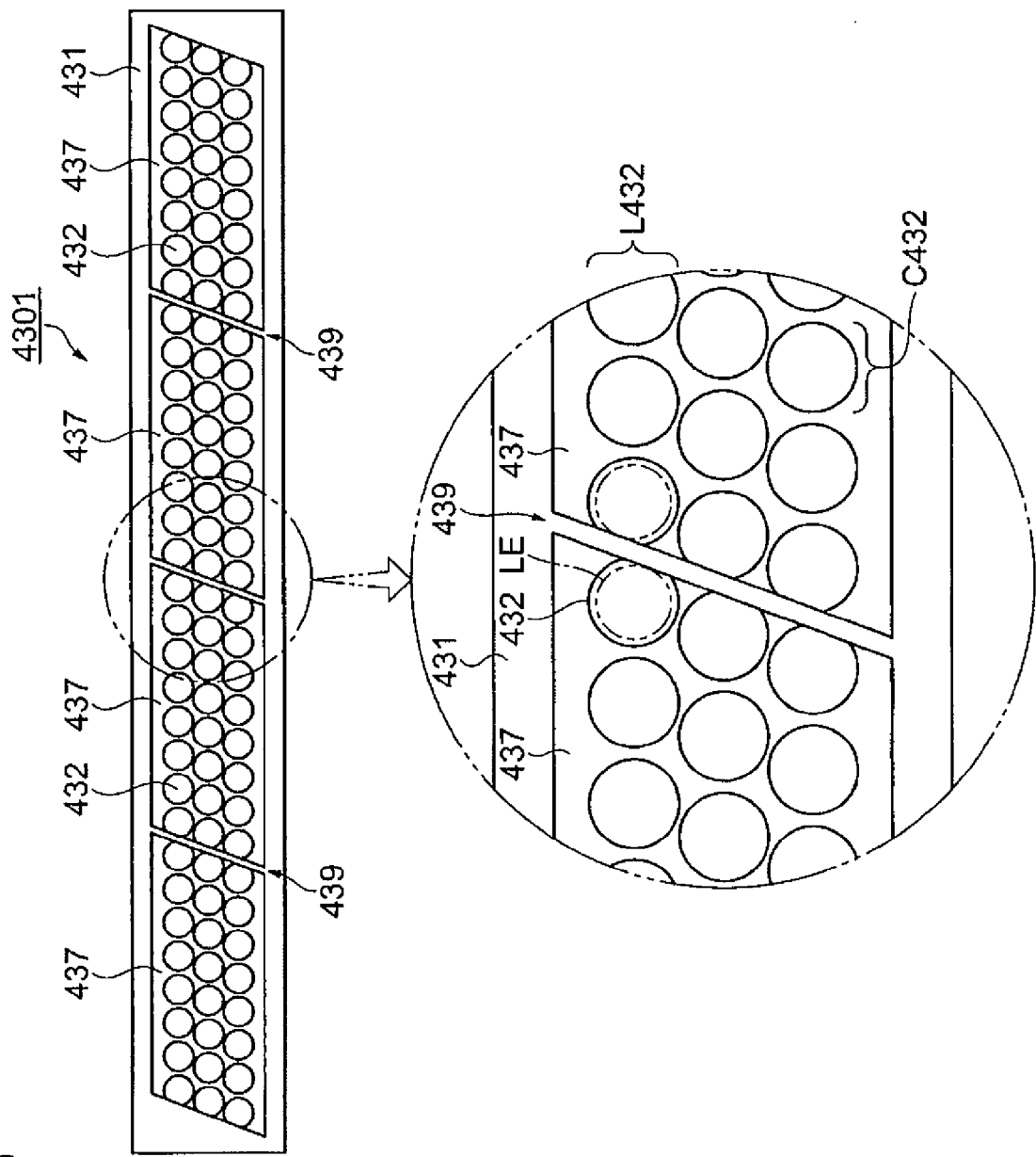
FIG. 10 is a plan view of a microlens array according to this embodiment.

FIG. 10 is a plan view of a microlens array 4301 according to this embodiment. The structure is similar to that according to the first embodiment except for the microlens array 4301. The same reference symbols denote the same components and materials as those used in the first embodiment.

In FIG. 10, the plastic lens substrates 437 which have the same shape are arranged and adhered side by side on the glass substrate 431.

According to such an embodiment, the following effect is realized in addition to the effects according to the earlier embodiment.

(5) Since the plastic lens substrates can be formed using one plastic lens substrate forming mold, the microlens array can be manufactured at an even less manufacturing cost.

Third Embodiment

Figure 11:
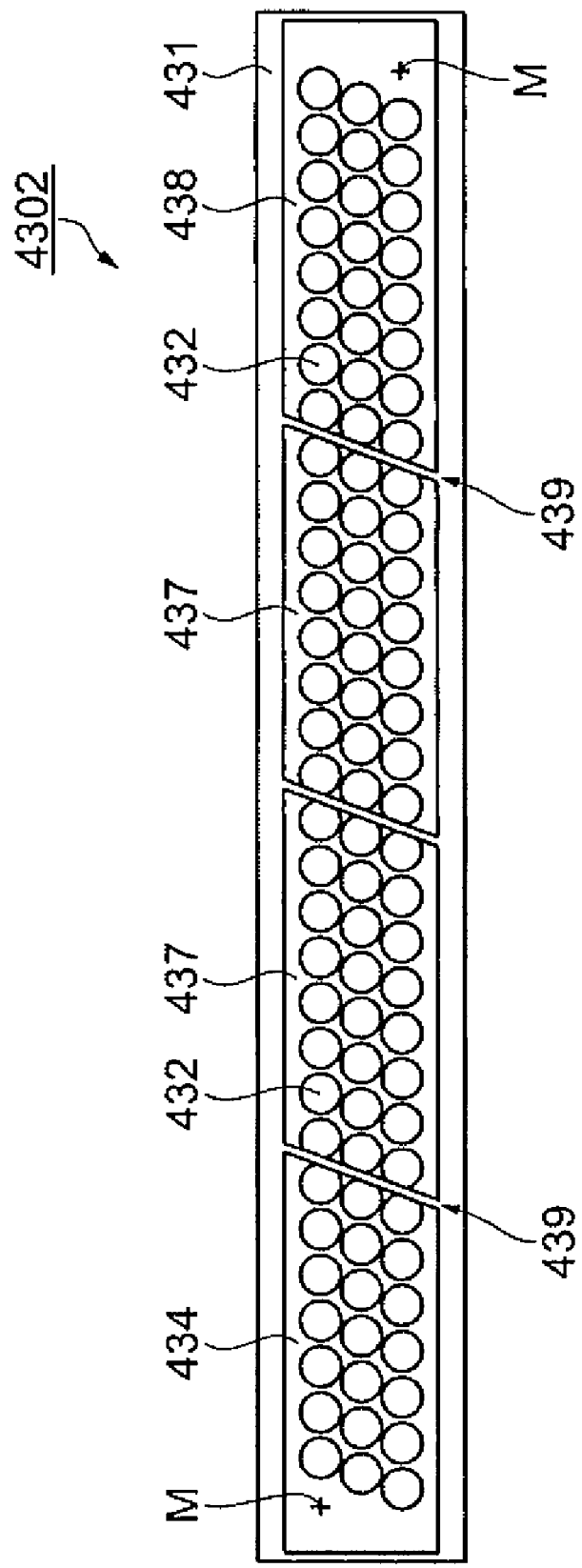
FIG. 11 is a plan view of a microlens array according to this embodiment.

FIG. 11 is a plan view of a microlens array 4302 according to this embodiment. The structure is similar to that according to the first embodiment except for the microlens array 4302. The same reference symbols denote the same components and materials as those used in the first embodiment.

In FIG. 11, alignment marks M for alignment to the glass substrate 431 are provided on the plastic lens substrates 434 and 438 which are at the both ends.

According to such an embodiment, the following effect is realized in addition to the effects according to the earlier embodiment.

(6) It is possible to more accurately align the lenses 432 and the lenses 433, which form the microlenses ML, to each other during bonding of the plastic lens substrates 434, 435, 437 and 438 and the like to the both surfaces of the glass substrate 431.

Fourth Embodiment

Figure 12:
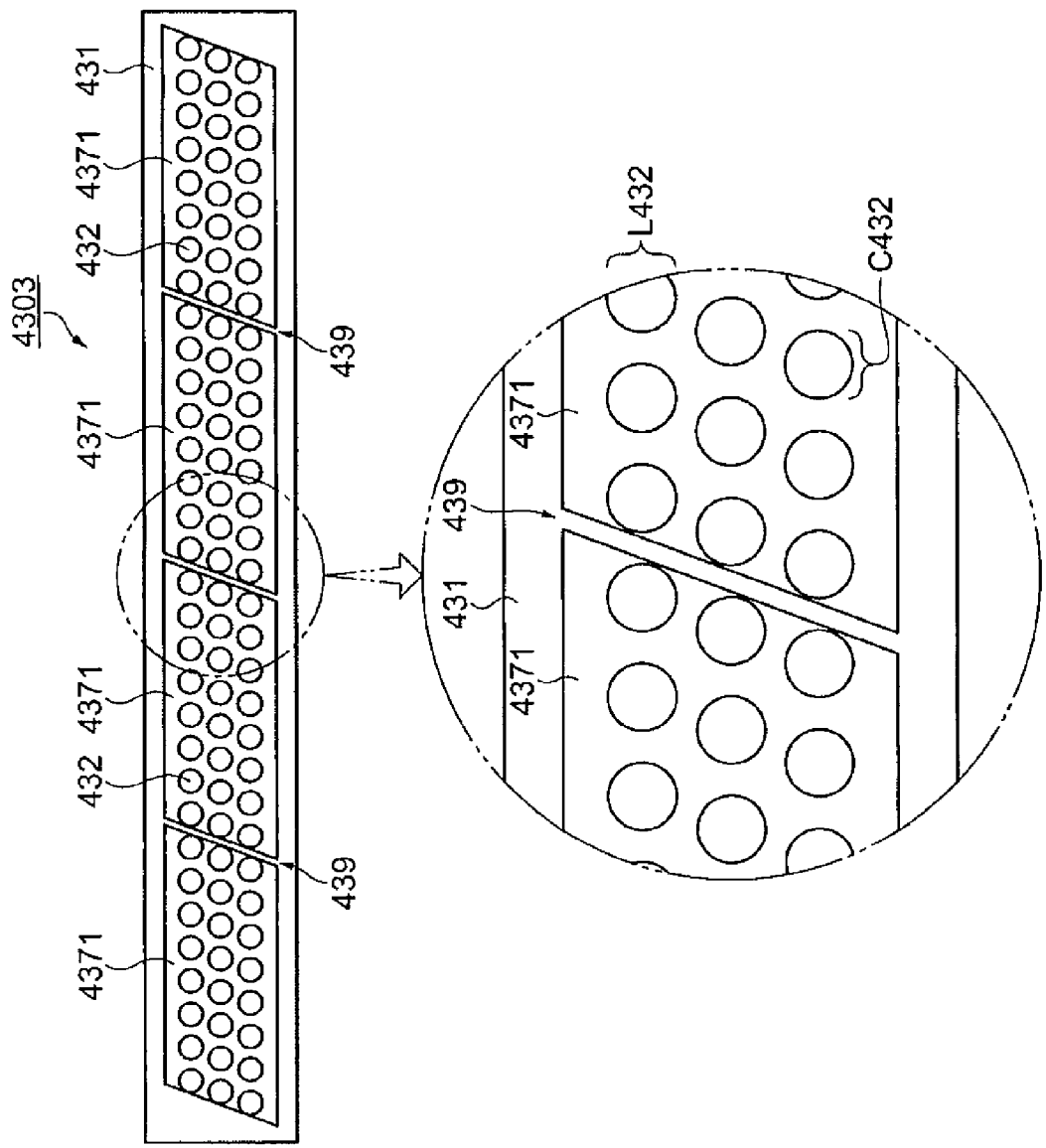
FIG. 12 is a plan view of a microlens array according to this embodiment.

FIG. 12 is a plan view of a microlens array 4303 according to this embodiment. The structure is similar to that according to the second embodiment except for the microlens array 4303. The same reference symbols denote the same components and materials as those used in the second embodiment.

An enlarged view of a vicinity of the gap 439 is shown in the circle of FIG. 12. In this embodiment, the gaps 439 are not formed such that they notch the lenses 432.

According to such an embodiment, similar effects to those described in effect (1) is obtained. In addition, the manufacturing cost is reduced further since it is not necessary to form the gaps 439 in such a fashion that the gaps 439 do not interfere with the effective ranges LE of the lenses.

Fifth Embodiment

Figure 13:
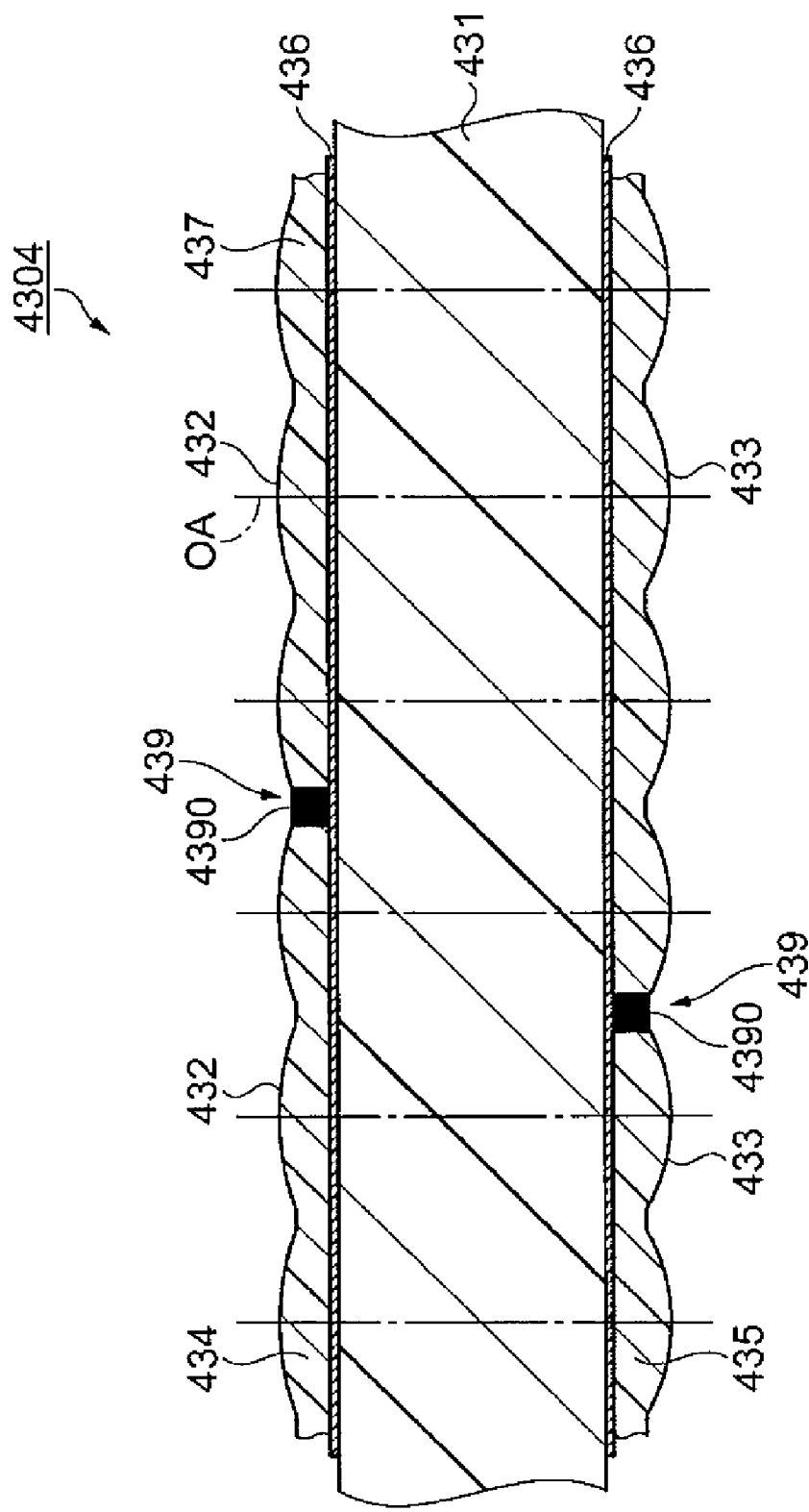
FIG. 13 is a partial cross sectional view of a microlens array according to this embodiment.

FIG. 13 is a partial cross sectional view of a microlens array 4304 according to this embodiment. The structure is similar to that according to the first embodiment except for the microlens array 4304. The same reference symbols denote the same components and materials as those used in the first embodiment.

In FIG. 13, the plastic lens substrates 434, 435 and 437 are arranged on the both surfaces of the glass substrate 431, and the positions of the gaps 439 relative to the surfaces of the glass substrate 431 are shifted from each other between these both surfaces.

According to such an embodiment, the following effect is realized in addition to the effects according to the earlier embodiment.

(7) The influence on the accuracy of position exerted by the gaps 439 can be dispersed by displacing the gaps 439. Hence, it is possible to obtain the microlens array 4304 in which the accuracy of position of the lenses 432 and 433 is preferable. Specifically, in this embodiment, the plurality of plastic lens substrates 437 are arranged side by side on the both surfaces of the glass substrate 431 (clear substrate) and the plurality of gaps 439 on the both surfaces of the glass substrate 431 are shifted from each other in the main scanning direction XX (the first direction). Accordingly, the influence on the accuracy of position exerted by the gaps 439 is dispersed by shifting the gaps 439 between the both surfaces of the glass substrate 431. Hence, the microlens array 4304 can be obtained in which the accuracy of relative position of the lenses is even better.

Sixth Embodiment

Figure 14:
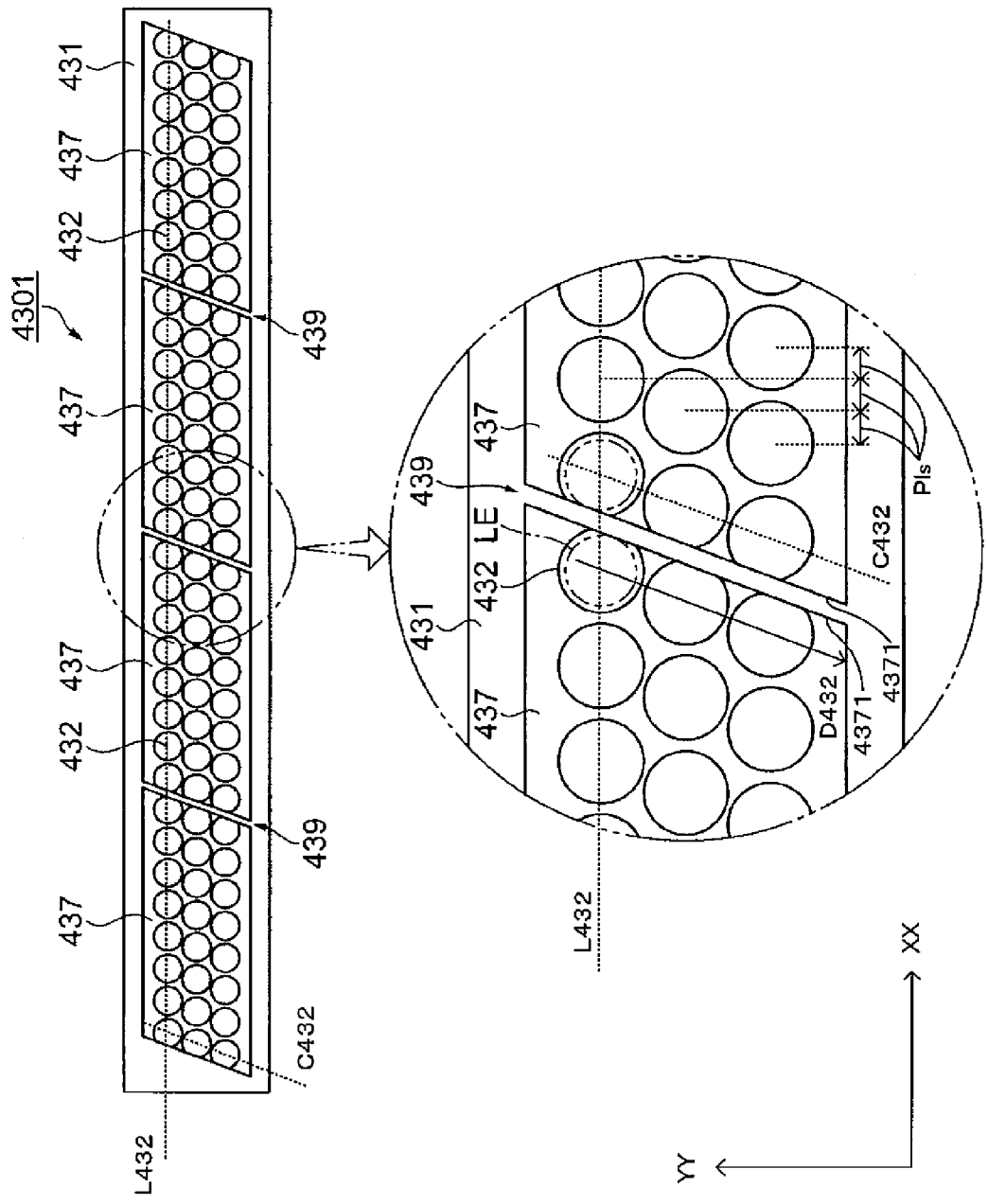
FIG. 14 is a plan view of a microlens array according to a sixth embodiment.
Figure 15:
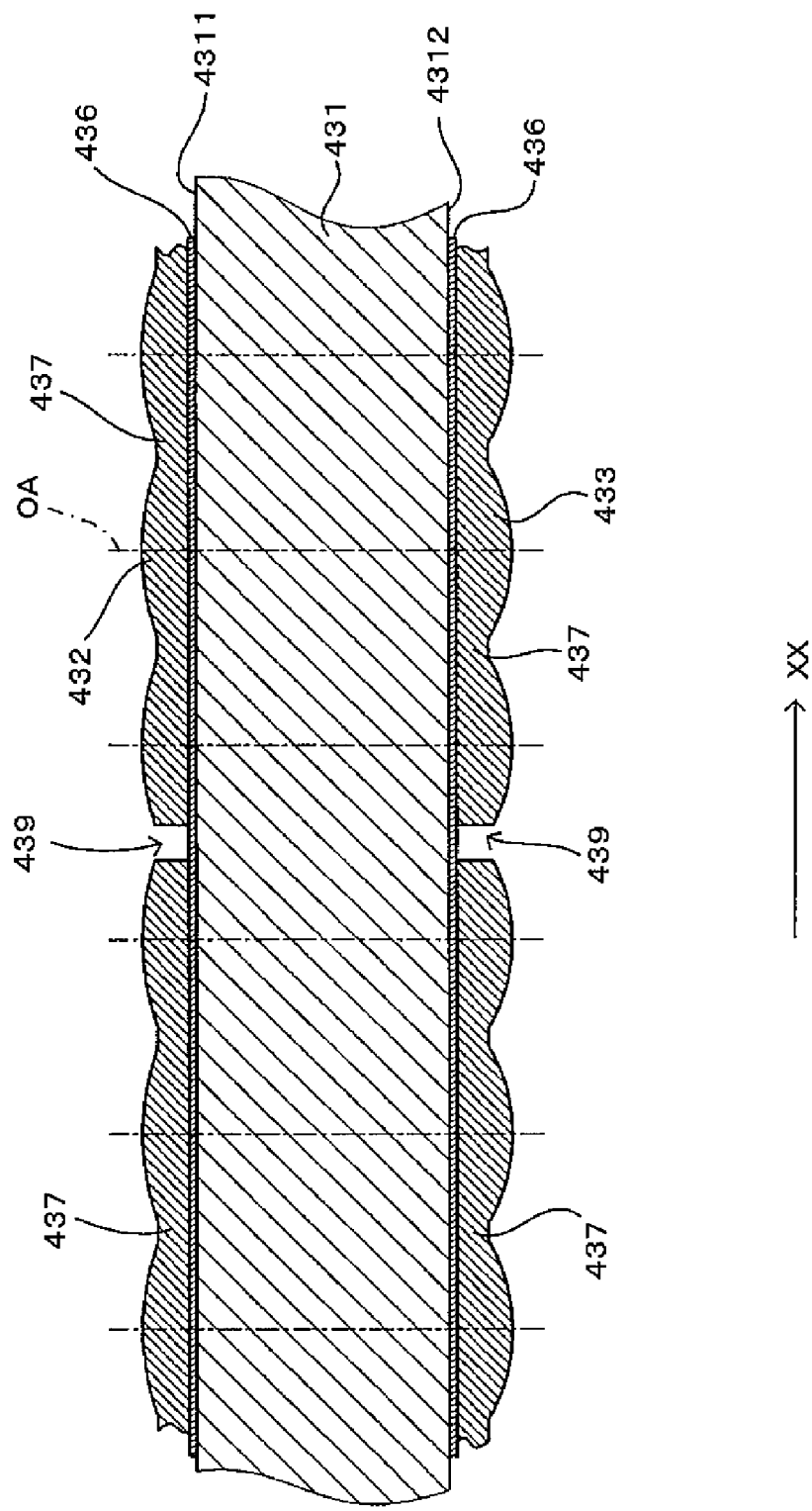
FIG. 15 is a partial cross sectional view of the microlens array shown in FIG. 14 taken along the main scanning direction.

FIG. 14 is a plan view of a microlens array according to a sixth embodiment. FIG. 15 is a partial cross sectional view of the microlens array shown in FIG. 14 taken along the main scanning direction. As shown in FIGS. 14 and 15, the microlens array 4301 comprises the glass substrate 431 (clear substrate). A plurality (four in this embodiment) of plastic lens substrates 437 are arranged on each one of the both surfaces 4311, 4312 of the glass substrate 431. The respective plastic lens substrates 437 have approximately the same shapes and are each shaped approximately as a parallelogram. In more detail, each plastic lens substrate 437 has the following structure.

The plastic lens substrate 437 comprises a plurality of lenses 432 and 433 which are formed, by injection molding, as they are integrated with the plastic lens substrate 437. As shown in FIG. 14, three lenses 432 are arrayed at mutually different positions in the sub scanning direction YY to constitute a lens column C432 in the plastic lens substrate 437. Three lenses 432 constituting the lens column C432 are shifted by lens pitches Pls in the main scanning direction XX. Accordingly, an arranging direction D432 of the lenses 432 in the lens column C432 is a direction different from the main scanning direction XX (the first direction) and oblique with respect to the sub scanning direction YY (the second direction).

In the plastic lens substrate 437, the plurality of lens columns C432 are arranged in the main scanning direction XX. Further, edges 4371 of the plastic lens substrate 437 in the main scanning direction XX are parallel (or approximately parallel) to the arranging direction D432. The edges 4371 are formed so as not to extend over the effective ranges LE of the lenses 432. A method of finishing the shapes of the edges 4371 in this way includes for instance a method of cutting, in the arranging direction D432, the edges in the main scanning direction XX of the plastic lens substrate 437 so as not to intrude into the effective ranges LE of the lenses 432.

In this embodiment, the plastic lens substrates 437 structured in this way are mounted to each of the surfaces 4311, 4312 of the glass substrate. Meanwhile, those lenses provided on the top surface of the glass substrate 431 are denoted at 432 and those lenses provided on the back surface are denoted at 433. As shown in FIG. 15, the lenses 432 and 433 are provided in a one-to-one correspondence with each other, and one lens 432 and the corresponding lens 433 share the optical axis OA. The plastic lens substrates 437 are adhered by the adhesive 436 to the surfaces 4311, 4312 of the glass substrate.

Four plastic lens substrates 437 are arranged in each one of the glass substrate surfaces 4311 and 4312. Taking the glass substrate surface 4311 as a representative example, the four plastic lens substrates 437 are located side by side in the main scanning direction XX with the gaps 439 therebetween. The two plastic lens substrates 437 adjacent to each other with the gap 439 in the middle are provided such that their edges 4371 are parallel to or approximately parallel to each other. As described above, the edges 4371 facing the gaps 439 are finished so as to be parallel to the arranging direction D432. Hence, the gap 439 formed between the two edges 4371 having such a shape is parallel to the arranging direction D432.

With the plastic lens substrates 437 attached to the glass substrate 431 in this fashion, the microlens array 4301 is obtained as described below in which the plurality of lenses 432 are in a two-dimensional arrangement. That is, in this microlens array 4301, the lens rows L432 are formed by the plurality of lenses 432 which are arranged in the main scanning direction XX and the three lens rows L432 are disposed at mutually different positions in the sub scanning direction YY. The respective lens rows L432 are shifted by lens pitches Pls in the main scanning direction XX, whereby a plurality of lens columns C432 tilted toward the sub scanning direction YY are arranged in the main scanning direction XX.

Thus, in this embodiment, since the microlens array 4301 is formed by arranging the plurality of plastic lens substrates 437 side by side, each plastic lens substrate 437 can be short. Accordingly, it is possible to form the plastic lens substrates 437 using a relatively small plastic lens substrate forming mold. In other words, since it is possible to manufacture the plastic lens substrates 437 using a mold which has a relatively high accuracy, it is possible to obtain the microlens array 4301 in which the accuracy of relative position of the lenses is improved and to reduce the manufacturing cost.

Further, the plurality of plastic lens substrates 437 are spaced apart from each other by the gaps 439. The gaps 439 can therefore absorb distortion with a temperature change attributable to a difference between the coefficient of thermal expansion of the plastic lens substrates 437 and that of the glass substrate 431, which improves the accuracy of relative position of the lenses regardless of a temperature change within the microlens array 4301.

Figure 16:
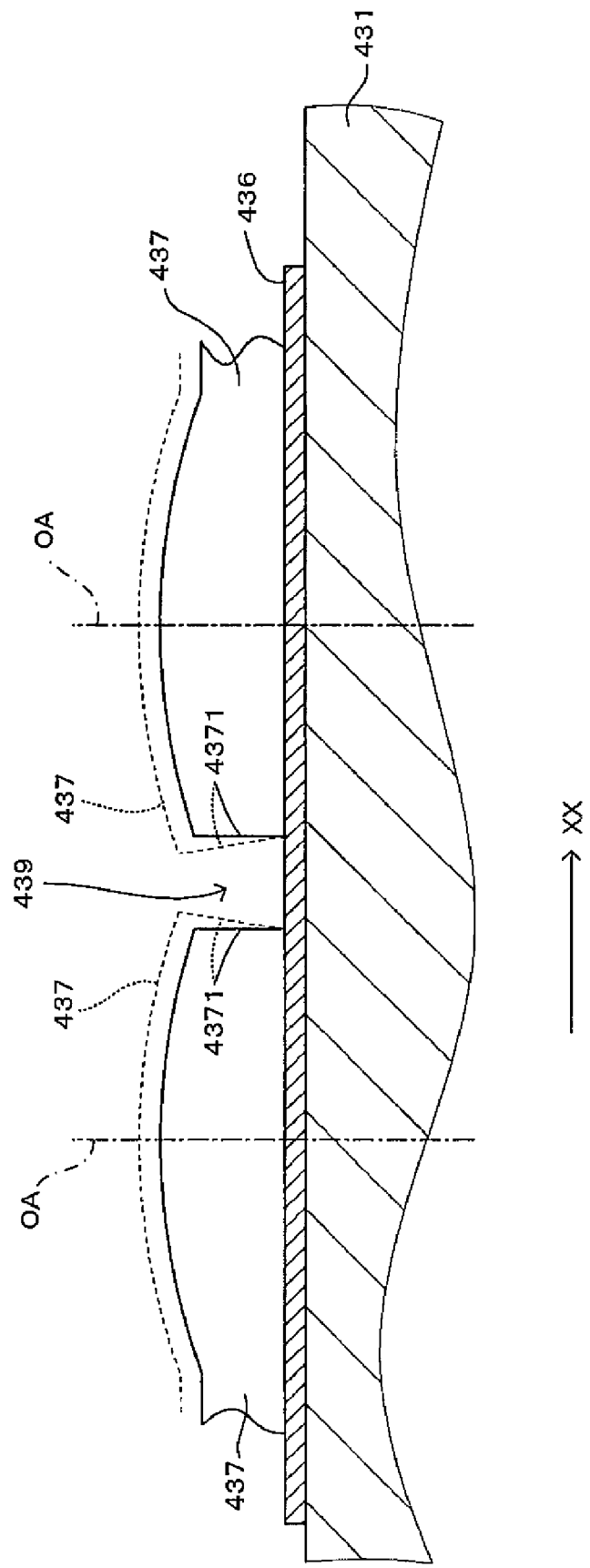
FIG. 16 is an explanatory diagram of the function which the gaps between the plastic lens substrates play.

This will now be described in more detail with reference to FIG. 16. FIG. 16 is an explanatory diagram of the function which the gaps between the plastic lens substrates play. Shown in FIG. 16 are both the plastic lens substrates 437 which do not include any distortion with a temperature change (denoted at the solid lines) and the plastic lens substrates 437 which are distorted in accordance with a temperature change (denoted at the dotted lines). In the example illustrated in FIG. 16, distortion generally expands the plastic lens substrates 437 as compared to where there is not distortion. As a result of the distortion due to the temperature change, the edges 4371 of the two plastic lens substrates 437 adjacent to each other in the main scanning direction XX come closer to each other. However, there is the gap 439 between these two plastic lens substrates 437 in the embodiment. Hence, even when there is distortion, the gap 439 absorbs the distortion, thereby suppressing occurrence of a situation that the two plastic lens substrates 437 contact with each other. The microlens array 4301 in which the accuracy of relative position of the lenses is better is thus obtained.

Further, in this embodiment, the plurality of plastic lens substrates 437 are arranged with the gaps 439 between each other in the main scanning direction XX. It is therefore possible to obtain in a simple manner the microlens array 4301 which is long in the main scanning direction XX.

Further, in the plastic lens substrates 437, the plurality of lenses 432 are arranged in the arranging direction D432 which is different from the main scanning direction XX to constitute the lens column C432, and the plurality of the lens columns C432 are arranged side by side in the main scanning direction XX. This structure achieves a two-dimensional arrangement of the plurality of the lenses in the microlens array 4301.

Further, of the edges 4371 of the plastic lens substrates 437 in the main scanning direction XX, at least those edges 4371 facing the gaps 439 are parallel or approximately parallel to the arranging direction D432, and the gaps 439 between two plastic lens substrates 437 adjacent to each other in the main scanning direction XX are formed parallel or approximately parallel to the arranging direction D432. Hence, by arranging the plurality of plastic lens substrates in the main scanning direction XX with the gaps 439 therebetween, the microlens array 4301 in which the plurality of the lenses are arranged in a two-dimensional arrangement is obtained in a simple fashion.

Furthermore, in this embodiment, the both edges 4371 of the plastic lens substrates 437 in the main scanning direction XX are parallel or approximately parallel to the arranging direction D432. In short, the shapes of the both edges 4371 of the plastic lens substrates 437 are approximately the same. It is therefore possible to simplify the structure of the plastic lens substrates 437 and to reduce the cost of the microlens array 4301.

Further, in this embodiment, the plurality of plastic lens substrates 437 are mounted side by side to each one of the both surfaces 4311, 4312 of the glass substrate 431. Due to this, even though there is a large difference between the coefficient of linear expansion of the glass substrate 431 and that of the plastic lens substrates 437, it is possible to suppress bending of the microlens array 4301 attributable to the so-called bimetal effect. It is therefore possible to obtain the microlens array 4301 in which the accuracy of relative position of the lenses is improved.

Further, the plurality of plastic lens substrates 437 of the microlens array 4301 have the same shape. Accordingly, it is possible to mold all plastic lens substrates 437 with one plastic lens substrate forming mold. Hence, the microlens array 4301 is obtained at a further reduced manufacturing cost.

Further, the plastic lens substrates 437 and the plurality of lenses 432 which the plastic lens substrates 437 comprise are formed as one integrated structure by injection molding. It is therefore possible to obtain the plastic lens substrates 437 which are highly accurate.

Further, in this embodiment, the glass substrate 431 is used as a clear substrate, which is preferable. That is, as the coefficient of linear expansion of glass is relatively small, this structure discourages a change of the clear substrate by temperature.

Seventh Embodiment

Figure 17:
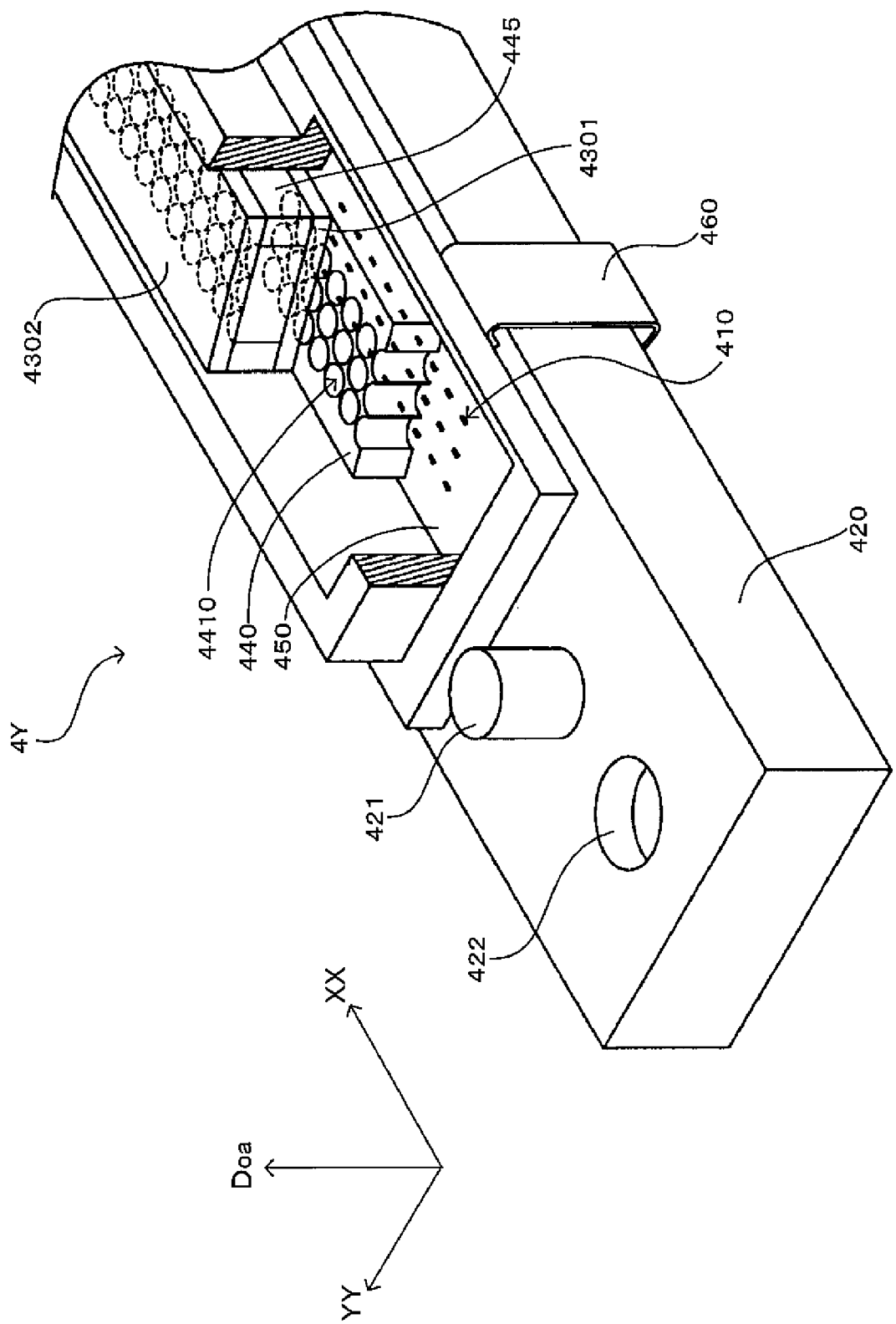
FIG. 17 is a perspective view schematically showing a line head in a seventh embodiment.
Figure 18:
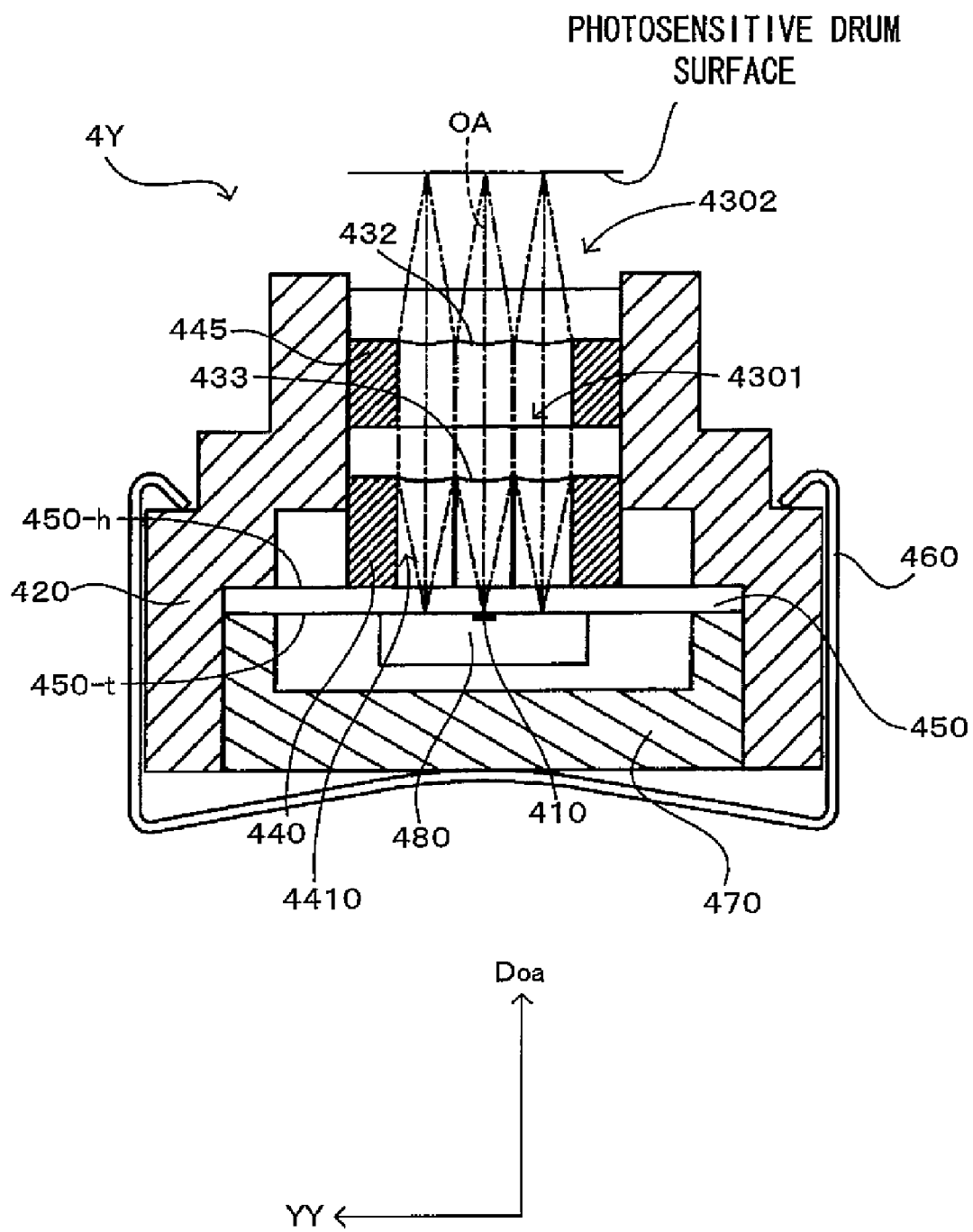
FIG. 18 is a partial cross sectional view of the line head shown in FIG. 17 taken along the width direction and parallel to the optical axes of the lenses.

FIG. 17 is a perspective view schematically showing a line head in a seventh embodiment. FIG. 18 is a partial cross sectional view of the line head shown in FIG. 17 taken along the width direction and parallel to the optical axes of the lenses. A difference of the seventh embodiment from the embodiments already described relates to the number of microlens arrays. In other words, the line head 4Y and the like in the seventh embodiment comprises two microlens arrays 4301 and 4302. Similar to the embodiments described above, a plurality of light emitting elements are formed in a head substrate 450 in the line head 4Y and the like and each light emitting element emits a light beam toward the surface of the photosensitive drum. Consequently, in this specification, a direction which is orthogonal to the main scanning direction XX and the sub scanning direction YY and which is toward the surface of the photosensitive drum from the light emitting elements is a propagation direction Doa of the light beams. The propagation direction Doa of the light beams is parallel to or approximately parallel to the optical axes OA. In relation to the seventh embodiment, differences from the embodiments described above will mainly be described but common structures will simply be denoted at corresponding reference symbols to avoid redundant description.

Inside the case 420 of the line head 4Y, the head substrate 450, the light shielding member 440 and the two microlens arrays 4301 and 4302 are provided. An inner portion of the case 420 abuts on the front surface 450-*h* of the head substrate 450, while the underside lid 470 abuts on the back surface 450-*t* of the head substrate 450. The light emitting element groups 410 which are groups of the plurality of light emitting elements are provided on the back surface 450-*t* of the head substrate 450. When the light emitting element groups 410 emit light beams toward the propagation direction Doa of the light beam, the light beams propagate toward the surface of the photosensitive drum after transmitting through the head substrate 450.

Further, the light shielding member 440 is adhered to and arranged on the front surface 450-*h* of the head substrate 450. In the light shielding member 440, a light guiding hole 4410 is formed for each one of the plurality of light emitting element groups 410. In other words, the plurality of light guiding holes 4410 are provided for the plurality of light emitting element groups 295 on a one-to-one correspondence. Each light guiding hole 4410 is bored in the light shielding member 440 as a hole which penetrates the light shielding member 440 in the propagation direction Doa of the light beam.

The two microlens arrays 4301 and 4302 are arranged side by side in the propagation direction Doa of the light beam on the upper side (namely, the opposite side to the head substrate 450) of the light shielding member 440. These two microlens arrays 4301 and 4302 are opposed to each other across a pedestal 445, and the pedestal 445 functions to define a gap between the microlens arrays 4301 and 4302. Since the two microlens arrays 4301 and 4302 are thus provided in this embodiment, the two lenses 433 and 432 which are arranged side by side in the propagation direction Doa of the light beam are opposed to each other in each light emitting element group 410. Here, the lenses 433 are the lenses which the microlens array 4301 comprises, while the lenses 432 are the lenses which the microlens array 4302 comprises. The optical axis OA which is on the center of each one of the two lenses 433 and 432 for the same light emitting element group 410 is orthogonal to or approximately orthogonal to the back surface 450-*t* of the head substrate 450. The two lenses 433 and 432 thus form one imaging optical system, and light beams emitted from the light emitting element group 410 are imaged by the imaging optical system which is opposed to the light emitting element group. Thus, in this embodiment, since the plurality of microlens arrays 4301 and 4302 are arranged side by side in the propagation direction Doa of the light beam, it is possible to improve the freedom of optical design.

Figure 19:
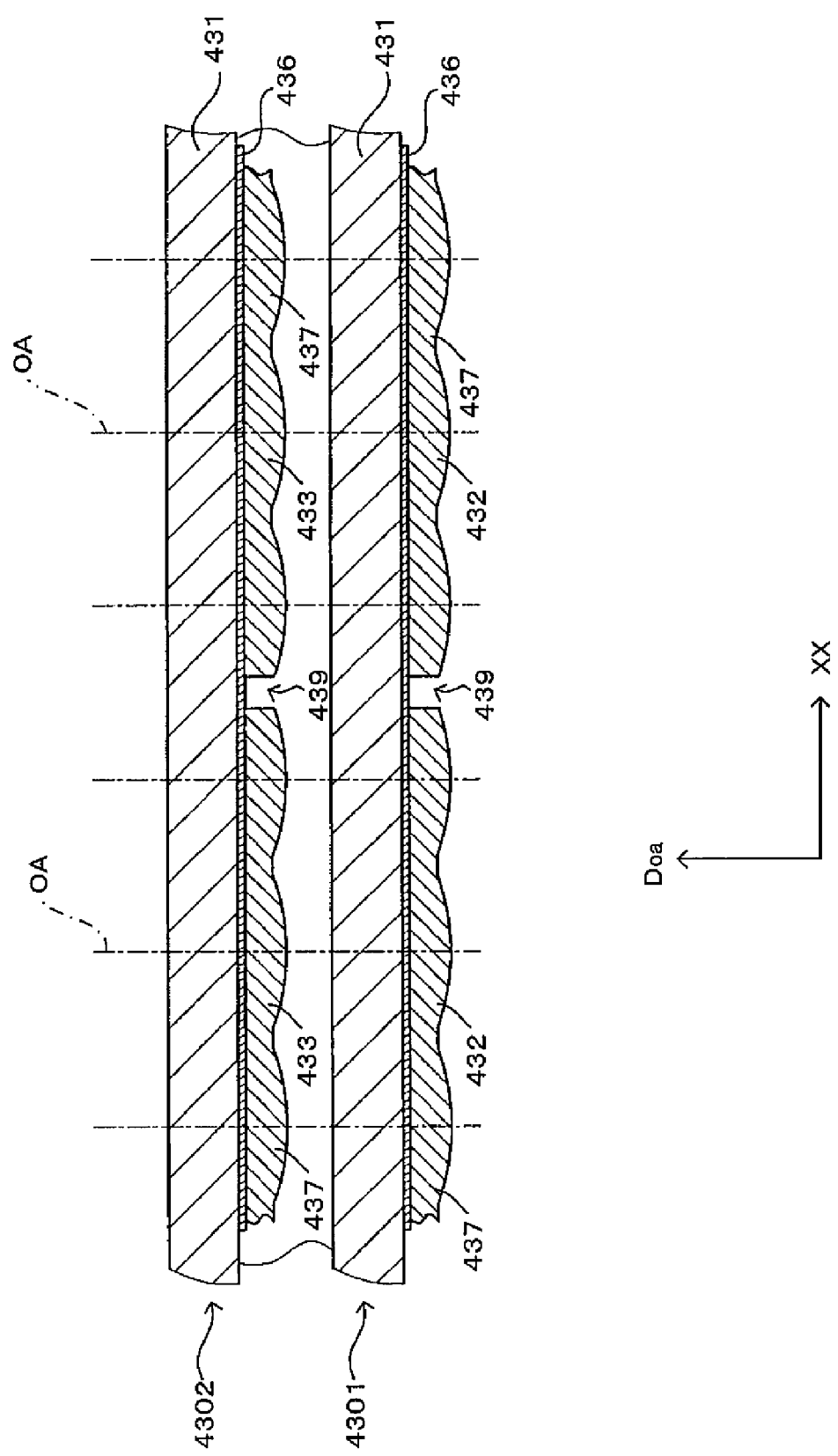
FIG. 19 is a partial cross sectional view which shows the structure of the two microlens arrays in the seventh embodiment.

FIG. 19 is a partial cross sectional view which shows the structure of the two microlens arrays in the seventh embodiment. As shown in FIG. 19, each one of the microlens arrays 4301 and 4302 is formed by adhering the plastic lens substrates 437 to the back surface of the glass substrate 431. Here, the back surface of the glass substrate 431 is one of the substrate surfaces of the glass substrate 431 which is on the upstream side in the propagation direction Doa of the light beam. In short, the plurality of plastic lens substrates 437 are arranged side by side in the main scanning direction XX with the gaps 439 between each other on the back surface of the glass substrate 431. Further, the plastic lens substrates 437 are adhered to the glass substrate 431 by the adhesive 436.

Thus, in the seventh embodiment as well, the plurality of plastic lens substrates 437 are arranged side by side to constitute the microlens array 4301. It is therefore possible to obtain the microlens array 4301 in which the accuracy of relative position of the lenses is improved and to reduce the manufacturing cost.

Further, the plurality of plastic lens substrates 437 are spaced apart from each other by the gaps 439. The gaps 439 can therefore absorb distortion with a temperature change attributable to a difference between the coefficient of thermal expansion of the plastic lens substrates 437 and that of the glass substrate 431, which improves the accuracy of relative position of the lenses in the microlens array 4301 despite a temperature change.

Eighth Embodiment

By the way, in any one of the embodiments above, the description is made in the case where the invention is applied to a microlens array in which the arranging direction D432 of the lenses 432 in the lens columns C432 is tilted with respect to the sub scanning direction YY. However, the structure of a microlens array to which the invention is applicable is not limited to this, and the invention is applicable also to a microlens array as that described below. A difference of the eighth embodiment from the preceding embodiments described above will now be principally described, but common structures will simply be denoted at corresponding reference symbols to avoid redundant description.

Figure 20:
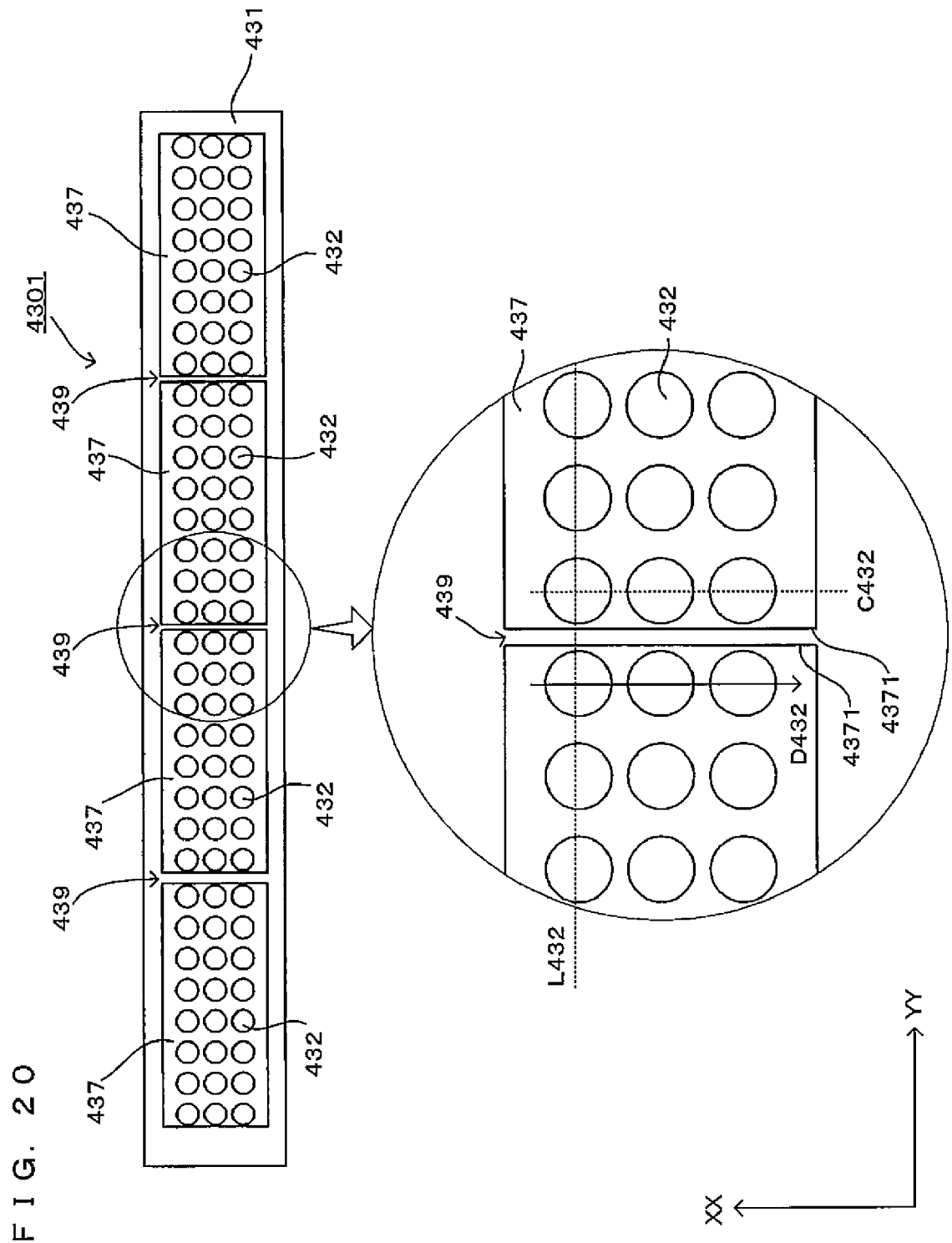
FIG. 20 is a plan view of a microlens array according to an eighth embodiment.

FIG. 20 is a plan view of a microlens array according to an eighth embodiment. The difference of the eighth embodiment from the preceding embodiments described above lies in the arranging direction D432 of the lenses 432 in the lens columns C432. In short, the arranging direction D432 of the lenses is oblique with respect to the sub scanning direction YY in the earlier embodiments. On the contrary, in the eighth embodiment, the arranging direction D432 of the lenses is parallel to or approximately parallel to the sub scanning direction YY. That is, as shown in FIG. 20, three lenses 432 are arrayed in the sub scanning direction YY to constitute a lens column C432 in the plastic lens substrates 437, and a plurality of lens columns C432 are arranged side by side in the main scanning direction XX. The edges 4371 of the plastic lens substrates 437 in the main scanning direction are parallel (or approximately parallel) to the arranging direction D432.

In this embodiment as well, four plastic lens substrates 437 are provided on the substrate surface of the glass substrate 431. The four plastic lens substrates 437 are arranged side by side in the main scanning direction XX with the gaps 439 therebetween. The two plastic lens substrates 437 adjacent to each other with the gap 439 in the middle are provided such that their edges 4371 are parallel to each other. The edges 4371 facing the gaps 439 are finished so as to be parallel to the arranging direction D432. Hence, the gap 439 formed between the two edges 4371 having such a shape is parallel to the arranging direction D432. In addition, since the arranging direction D432 is parallel to the sub scanning direction YY, the gap 439 is parallel to the sub scanning direction YY.

Thus, in the eighth embodiment as well, the microlens array 4301 is obtained as the plurality of plastic lens substrates 437 are arranged side by side. It is therefore possible to realize the microlens array 4301 in which the accuracy of relative position of the lenses is improved and to reduce the manufacturing cost.

Further, the plurality of plastic lens substrates 437 are spaced apart from each other by the gaps 439. The gaps 439 can therefore absorb distortion with a temperature change attributable to a difference between the coefficient of thermal expansion of the plastic lens substrates 437 and that of the glass substrate 431, which improves the accuracy of relative position of the lenses regardless of a temperature change within the microlens array 4301.

Others

Thus, in the above embodiments, the main scanning direction XX corresponds to the "first direction" of the invention and the sub scanning direction YY corresponds to the "second direction" of the invention.

As described above, a lens array according to an embodiment comprises a clear substrate and a plurality of plastic lens substrates. Each of the plastic lens substrates includes a plurality of the lenses and the plurality of plastic lens substrates are provided on at least one surface of the clear substrate.

Further, a line head according to an embodiment comprises a lens array and a head substrate. The lens array includes a clear substrate and a plurality of plastic lens substrates. Each of the plastic lens substrates includes a plurality of the lenses and the plurality of plastic lens substrates are provided on at least one surface of the clear substrate. A plurality of light emitting element groups each of which are groups of a plurality of light emitting elements are arranged on the head substrate. The lenses are opposed to the light emitting element groups in the lens array, and lights emitted from the light emitting element groups impinge upon the lenses and are imaged by imaging optical systems which include the lenses.

Further, an image forming apparatus according to an embodiment comprises a latent image carrier, a lens array and a head substrate. The lens array comprises a clear substrate and a plurality of plastic lens substrates. Each of the plastic lens substrates includes a plurality of lenses and the plurality of plastic lens substrates are arranged on at least one of the surfaces of the clear substrate. A plurality of light emitting element groups each of which are groups of a plurality of light emitting elements are arranged on the head substrate. The lenses are opposed to the light emitting element groups in the lens array, and lights emitted from the light emitting element groups impinge upon the lenses and are imaged by imaging optical systems which include the lenses to form spots on a surface of the latent image carrier.

According to the embodiment (the lens array, the line head and the image forming apparatus) structured in this way, the plurality of plastic lens substrates are arranged side by side to constitute the lens array. Hence, each plastic lens substrate can be shortened. It is therefore possible to manufacture the plastic lens substrates using a relatively small plastic lens substrate forming mold. In other words, since it is possible to manufacture the plastic lens substrates using a mold which has a relatively high accuracy, it is possible to obtain a lens array in which the accuracy of relative position of the lenses is improved and to reduce the manufacturing cost.

The plurality of plastic lens substrates may be arranged spaced apart from each other by gaps. In such a structure, the gaps can absorb distortion with a temperature change attributable to a difference between the coefficient of thermal expansion of the plastic lens substrates and that of the clear substrate, which improves the accuracy of relative position of the lenses in the lens array despite a temperature change.

The plurality of plastic lens substrates may be arranged side by side with gaps from each other in a first direction. Such a structure makes it possible to obtain a lens array which is long in the first direction in a simple manner.

In the plastic lens substrates, it may be structured that a plurality of lenses are arrayed in an arranging direction different from the first direction to constitute a lens column and a plurality of the lens columns are arranged side by side in the first direction. Such a structure makes it possible to arrange the plurality of lenses two-dimensionally in the lens array.

It may be structured that at least those facing the gaps among edges of the plastic lens substrates in the first direction are parallel or approximately parallel to the arranging direction, and the gap between two plastic lens substrates adjacent in the first direction is parallel or approximately parallel to the arranging direction. Such a structure makes it possible to obtain a lens array in a simple way in which the plurality of lenses are two-dimensionally arranged by arranging the plurality of plastic lens substrates side by side in the first direction with the gaps therebetween.

In relation to this, the both edges of the plastic lens substrates in the first direction may be parallel or approximately parallel to the arranging direction. In such a structure, the both edges of the plastic lens substrates have approximately the same shapes. It is therefore possible to simplify the structure of the plastic lens substrates and to reduce the cost of the lens array.

At this time, the arranging direction may be tilted to a second direction which is orthogonal to the first direction. Alternatively, the arranging direction may be parallel or approximately parallel to the second direction which is orthogonal to the first direction.

The gaps may be filled with a light absorbing material. Filling the gaps with the light absorbing material makes it possible to suppress scattering of light at the interfaces between the gaps and the plastic lens substrates. It is therefore possible to obtain a lens array which gives rise to less stray light.

The plurality of plastic lens substrates may be arranged side by side on each one of the both surfaces of the clear substrate. This structure suppresses bending of the lens array attributable to the so-called bimetal effect even when there is a large difference between the coefficient of linear expansion of the clear substrate and that of the plastic lens substrates. It is therefore possible to obtain the lens array in which the accuracy of relative position of the lenses is improved.

Further, the plurality of plastic lens substrates may be arranged side by side on each one of the both surfaces of the clear substrate and the plurality of gaps formed on the both surfaces of the clear substrate may be shifted from each other in the first direction. In this structure, the influence on the accuracy of position exerted by the gaps is dispersed because of the shifting of the gaps between the both surfaces of the clear substrate. It is therefore possible to obtain the lens array in which the accuracy of relative position of the lenses is improved.

The plurality of plastic lens substrates may be formed to have approximately the same shapes. Such a structure makes it possible to form the plastic lens substrates using one plastic lens substrate forming mold. Hence, the lens array can be manufactured at an even less manufacturing cost.

Further, the plastic lens substrates may be formed as they are integrated with the plurality of lenses by injection molding. Forming in this way makes it possible to obtain plastic lens substrates with high accuracy.

The plastic lens substrates may be adhered to the clear substrate by an adhesive. The adhesive may be a thermosetting resin or an ultraviolet cure adhesive. Using an ultraviolet cure adhesive, it is possible to bond the clear substrate and the plastic lens substrates to each other under UV light after aligning the clear substrate and the plastic lens substrates to each other.

The clear substrate may be a glass substrate. Since the coefficient of linear expansion of glass is relative small, this structure suppresses a change by temperature of the clear substrate.

Alignment marks for alignment to the clear substrate may be provided on the plastic lens substrates because this makes aligning of the plastic lens substrates simple and easy.

An advantage of some aspects of the invention is to solve the above problems at least partially. The invention may be implemented as the following examples or applications.

First Example of Application

A microlens array in which a plurality of plastic lens substrates comprising a plurality of imaging lenses are arranged side by side on one surface or the both surfaces of a clear substrate and in which gaps are provided between the plastic lens substrates.

In this example of application, the plurality of plastic lens substrates are arranged side by side to constitute the microlens array. Hence, each plastic lens substrate becomes short. Accordingly, the size of a mold for forming the plastic lens substrates is reduced, which makes it possible to lower the manufacturing cost and to obtain a microlens array in which the accuracy of relative position of the lenses is improved. In addition, the gaps can absorb distortion with a temperature change attributable to a difference between the coefficient of thermal expansion of the plastic lens substrates and that of the clear substrate, which improves the accuracy of relative position of the lenses in the lens array regardless of a temperature change.

Second Example of Application

The above microlens array in which the plastic lens substrates have the same shape. The same shape herein referred to encompasses differences of shapes which are created during manufacturing. In this example of application, since the plastic lens substrates can be formed using one plastic lens substrate forming mold, the microlens array is obtained at an even less manufacturing cost.

Third Example of Application

The above microlens array in which positions of the gaps relative to the surfaces of the clear substrate are shifted between the both surfaces. In this example of application, the influence on the accuracy of position exerted by the gaps is dispersed because of the shifting of the gaps between the both surfaces of the clear substrate. It is therefore possible to obtain a microlens array in which the accuracy of relative position of the lenses is even better.

Fourth Example of Application

A line head comprising a substrate, a plurality of light emitting element groups, a plurality of imaging lenses, a microlens array and a light shielding member. The plurality of light emitting element groups include a plurality of light emitting elements and are arranged side by side on the substrate. The plurality of imaging lenses are arranged opposed to the light emitting element groups on a one-to-one correspondence and image upon a surface-to-be-scanned light emitted from the plurality of light emitting elements belonging to the light emitting element groups to which the imaging lenses are respectively opposed to. The microlens array includes a plurality of plastic lens substrates and a clear substrate. The plurality of plastic lens substrates include the plurality of imaging lenses and are arranged side by side on one surface or the both surfaces of the clear substrate. Gaps are formed between the plastic lens substrates. The light shielding member is provided between the substrate and the microlens array.

According to this example of application, it is possible to obtain a line head which realizes the effects described above.

Fifth Example of Application

The above line head in which shapes of the plastic lens substrates are the same. According to this example of application, it is possible to obtain a line head which realizes the effects described above.

Sixth Example of Application

The above line head in which positions of the gaps relative to the surfaces of the clear substrate are shifted between the both surfaces. According to this example of application, it is possible to obtain a line head which realizes the effects described above.

Seventh Example of Application

An image forming apparatus comprising a latent image carrier whose surface is transported in a sub scanning direction and an exposure unit which forms, the surface of the latent image carrier as the surface-to-be-scanned, spots on the latent image carrier surface and which has the same structure as any one of the above line heads.

According to this example of application, it is possible to obtain an image forming apparatus which realizes the effects described above.

Modifications

Figure 21:
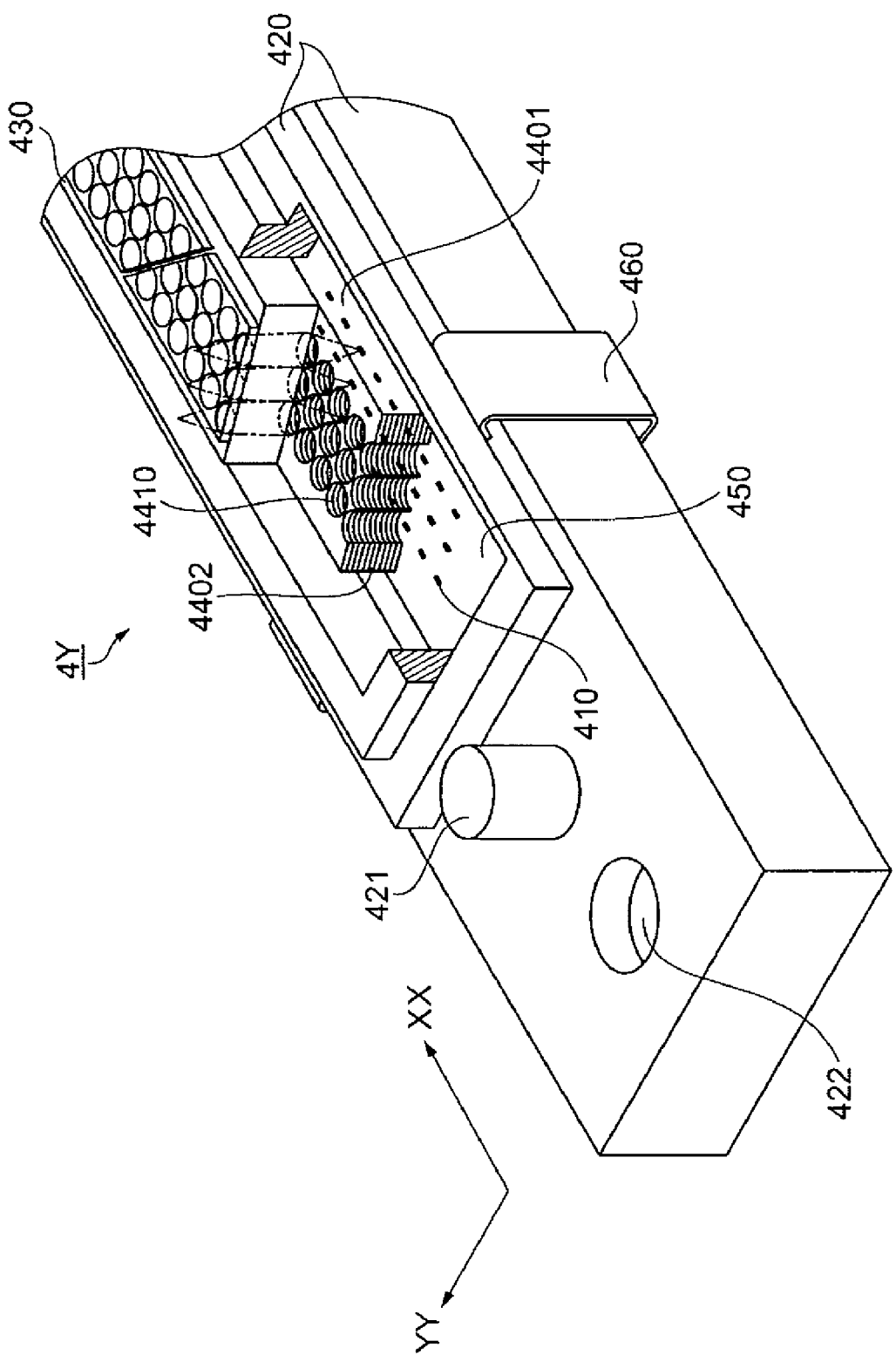
FIG. 21 is a perspective view schematically showing the line head of a modification.

The embodiments above and modifications thereof are not limiting. To the extent not deviating from the intention, further various modifications other than the above may be implemented. For example, the light shielding member 4401 of the line head 4Y may be a stack of light shielding plates 4402 as shown in FIG. 21.

Further, for the purpose of preventing reflection of light, light absorbing layers which absorb light may be provided on the inner surfaces of the light guide holes 4410 and the like. The light absorbing layers may be matte-black paint layers, chromium plated layers, galvanized layers, nickel plated layers, nickel-phosphorus plated layers, copper oxide layers, black alumite-treated layers, black membranes of diamond-like carbon or the like, etc.

Further, in the above embodiments, the light emitting element groups 410 are two dimensionally arranged such that three light emitting element group rows L411 (group rows), in each of which a specified number (two or more) of light emitting element groups 410 are aligned in the main scanning direction XX, are arranged in the sub scanning direction YY. However, the arrangement mode of the plurality of light emitting element groups 410 is not limited to this and can be suitably changed.

In the above embodiments, a plurality of spots are formed side by side in a straight line in the main scanning direction XX as shown in FIG. 9 using the line head. However, such a spot forming operation is only an example of the operation of the line head, and operations executable by the line head are not limited to this. In other words, spots to be formed need not be formed side by side along a straight line in the main scanning direction XX and, for example, may be formed side by side along a line at a specified angle to the main scanning direction XX or may be formed in a zigzag or wavy manner.

Although the invention is applied to the color image forming apparatuses in the above respective embodiments and modifications, the application subject of the invention is not limited to this and the invention is also applicable to monochromatic image forming apparatuses for forming so-called monochromatic images. Further, the invention is applicable not only to image forming apparatuses using the liquid toner in which toner particles are dispersed in the nonvolatile liquid carrier, but also to image forming apparatuses using a dry toner.

Further, the plastic lens substrates 437 and the like are mounted to the glass substrate 431 by the adhesive in the embodiments above. However, a method of mounting the plastic lens substrates 437 and the like is not limited to this.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A line head, comprising:
   a lens array which includes a clear substrate and a plurality of plastic lens substrates each of which includes a plurality of lenses and which are arranged on at least one of surfaces of the clear substrate; and
   a head substrate on which a plurality of light emitting element groups which are groups of a plurality of light emitting elements are arranged, wherein
   the plurality of plastic lens substrates are arranged in a longitudinal direction and have plane surfaces that are adjoined to a surface of the clear substrate,
   the lenses are arranged opposed to the light emitting element groups in the lens array, and
   light emitted from the light emitting element groups impinges upon the lenses and is imaged by an imaging optical system which includes the lenses.

2. The line head of claim 1, wherein the light emitted from one of the light emitting element groups impinges upon one of the lenses.

3. An image forming apparatus, comprising:
   a latent image carrier;
   a lens array which includes a clear substrate and a plurality of plastic lens substrates each of which includes a plurality of lenses and which are arranged on at least one of surfaces of the clear substrate; and a head substrate on which a plurality of light emitting element groups which are groups of a plurality of light emitting elements are arranged, wherein the plurality of plastic lens substrates are arranged in a longitudinal direction and have plane surfaces that are adjoined to a surface of the clear substrate, the lenses are arranged opposed to the light emitting element groups in the lens array, and light emitted from the light emitting element groups impinges upon the lenses and is imaged by an imaging optical system which include the lenses to form spots on the surface of the latent image carrier.

4. The image forming apparatus of claim 3, wherein the light emitted from one of the light emitting element groups impinges upon one of the lenses.

* * * * *